(12) United States Patent
Saito

(10) Patent No.: US 12,468,162 B2
(45) Date of Patent: Nov. 11, 2025

(54) VIRTUAL IMAGE DISPLAY

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 285 days.

(21) Appl. No.: 18/173,088

(22) Filed: Feb. 23, 2023

(65) Prior Publication Data

US 2023/0273445 A1 Aug. 31, 2023

(30) Foreign Application Priority Data

Feb. 25, 2022 (JP) ................ 2022-027695

(51) Int. Cl.
*G02B 27/01* (2006.01)
*F21V 8/00* (2006.01)

(52) U.S. Cl.
CPC ....... *G02B 27/0179* (2013.01); *G02B 6/0026* (2013.01); *G02B 6/0076* (2013.01); *G02B 27/01* (2013.01); *G02B 27/0172* (2013.01); *G02B 2027/0178* (2013.01); *G02B 2027/0187* (2013.01)

(58) Field of Classification Search
CPC .. G02B 6/0016; G02B 6/0026; G02B 6/0076; G02B 27/0081; G02B 27/0093; G02B 27/01; G02B 27/0172; G02B 27/0179; G02B 2027/0125; G02B 2027/0138; G02B 2027/0174; G02B 2027/0178; G02B 2027/0187
See application file for complete search history.

(56) References Cited

U.S. PATENT DOCUMENTS

| | | | |
|---|---|---|---|
| 2019/0056600 A1 | 2/2019 | Danziger et al. | |
| 2019/0155046 A1 | 5/2019 | Wall et al. | |
| 2020/0026080 A1* | 1/2020 | Pierer | H01S 5/023 |
| 2020/0249754 A1* | 8/2020 | Morozov | G06F 3/0304 |
| 2021/0181515 A1 | 6/2021 | Ellenbogen et al. | |

(Continued)

FOREIGN PATENT DOCUMENTS

JP 2020504832 2/2020

*Primary Examiner* — Uyen Chau N Le
*Assistant Examiner* — Emma R. Oxford
(74) *Attorney, Agent, or Firm* — JCIPRNET

(57) ABSTRACT

A virtual image display device includes an image light generating device, an infrared light emitting device, an infrared light receiving device, a first light guide optical system, and a second light guide optical system. The first light guide optical system includes a first light guide member, a first incident-side diffraction element, and a first emitting-side diffraction element. The second light guide optical system includes a second light guide member, a second incident-side diffraction element, and a second emitting-side diffraction element. The maximum value of an angle formed between the infrared light that the second incident-side diffraction element deflects toward the infrared light receiving device and a normal line of the second incident-side diffraction element is greater than the maximum value of an angle formed between the image light incident on the first incident-side diffraction element and a normal line of the first incident-side diffraction element.

12 Claims, 22 Drawing Sheets

(56) References Cited

U.S. PATENT DOCUMENTS

2022/0035161 A1* 2/2022 Sinay ................. G02B 27/0172
2022/0043511 A1 2/2022 Popovich et al.
2022/0350153 A1* 11/2022 Takashima ......... G02B 27/0093
2022/0365596 A1* 11/2022 Mattila .................... G02B 6/00

* cited by examiner

VIRTUAL IMAGE DISPLAY

The present application is based on, and claims priority from JP Application Serial Number 2022-027695, filed Feb. 25, 2022, the disclosure of which is hereby incorporated by reference herein in its entirety.

BACKGROUND

1. Technical Field

The present disclosure relates to a virtual image display device that enables observation of a virtual image and more particularly to a virtual image display device that utilizes diffraction and light guiding.

2. Related Art

A device that includes a projector, a camera, a first light guide optical element, and a second light guide optical element as an HMD that enables observation of a virtual image, wherein light reflected from the eye is injected into the second light guide optical element by a plurality of small partially-transmissive flat surfaces incorporated in the second light guide optical element and an image of the eye is injected into the camera through the first light guide optical element and the like, thus enabling detection of the direction of the line of sight, is known (JP-T-2020-504832). JP-T-2020-504832 also discloses that a light source that emits infrared light is incorporated as an optical system for line-of-sight observation and reflected light that has returned is incident on the camera (see FIGS. 18 and 19 in JP-T-2020-504832).

In line-of-sight detection, it is desirable that the line of sight be detected in a range wider than the viewing angle of image light because an image viewed by the user is usually smaller than the movement range of the user's eye. In the device disclosed in JP-T-2020-504832, an IR light source for line-of-sight detection and an RGB light source for image light are separately provided, while the size of the IR light source is smaller than that of the RGB light source or the like. Thus, the range in which the movement of the user's eye can be detected is limited and it is understood that it is not easy to detect the line of sight in a range wider than the viewing angle of image light.

SUMMARY

A virtual image display device according to an aspect of the present disclosure includes an image light generating device configured to emit image light, an infrared light emitting device configured to emit infrared light, an infrared light receiving device configured to receive the infrared light, a first light guide optical system including a first light guide member, a first incident-side diffraction element provided on an incident side of the first light guide member, and a first emitting-side diffraction element provided on an emitting side of the first light guide member, and a second light guide optical system including a second light guide member, a second incident-side diffraction element provided on an incident side of the second light guide member, and a second emitting-side diffraction element provided on an emitting side of the second light guide member, wherein the first incident-side diffraction element deflects the image light emitted from the image light generating device such that the image light is incident on the first light guide member, the first emitting-side diffraction element deflects the image light guided in the first light guide member and emits the image light toward an eye position of a user, the second incident-side diffraction element deflects the infrared light emitted from the infrared light emitting device such that the infrared light is incident on the second light guide member, the second emitting-side diffraction element deflects the infrared light guided in the second light guide member and emits the infrared light toward the eye position of the user and deflects the infrared light from the eye position of the user such that the infrared light is incident on the second light guide member, the second incident-side diffraction element emits the infrared light deflected by the second emitting-side diffraction element and incident on the second light guide member toward the infrared light receiving device, and a maximum value of an angle formed between the infrared light that the second incident-side diffraction element deflects toward the infrared light receiving device and a normal line of the second incident-side diffraction element with respect to a light guiding direction is greater than a maximum value of an angle formed between the image light incident on the first incident-side diffraction element and a normal line of the first incident-side diffraction element.

A virtual image display device according to an aspect of the present disclosure includes an image light generating device configured to emit image light, an infrared light emitting device configured to emit infrared light, an infrared light receiving device configured to receive the infrared light, and a first light guide optical system including a first light guide member, a first incident-side diffraction element provided on an incident side of the first light guide member, and a first emitting-side diffraction element provided on an emitting side of the first light guide member, wherein the first incident-side diffraction element deflects the image light emitted from the image light generating device and the infrared light emitted from the infrared light emitting device such that the image light and the infrared light are incident on the first light guide member, the first emitting-side diffraction element deflects the image light and the infrared light guided in the first light guide member and emits the image light and the infrared light toward an eye position of a user and deflects the infrared light from the eye position of the user such that the infrared light is incident on the first light guide member, the first incident-side diffraction element emits the infrared light deflected by the first emitting-side diffraction element and incident on the first light guide member toward the infrared light receiving device, and a maximum value of an angle formed between the infrared light that the first incident-side diffraction element deflects toward the infrared light receiving device and a normal line of the first incident-side diffraction element with respect to a light guiding direction is greater than a maximum value of an angle formed between the image light incident on the first incident-side diffraction element and a normal line of the first incident-side diffraction element.

DESCRIPTION OF EXEMPLARY EMBODIMENTS

First Embodiment

A first embodiment of a virtual image display device according to the present disclosure will be described in detail below with reference to FIGS. 1 to 5.

Figure 1:
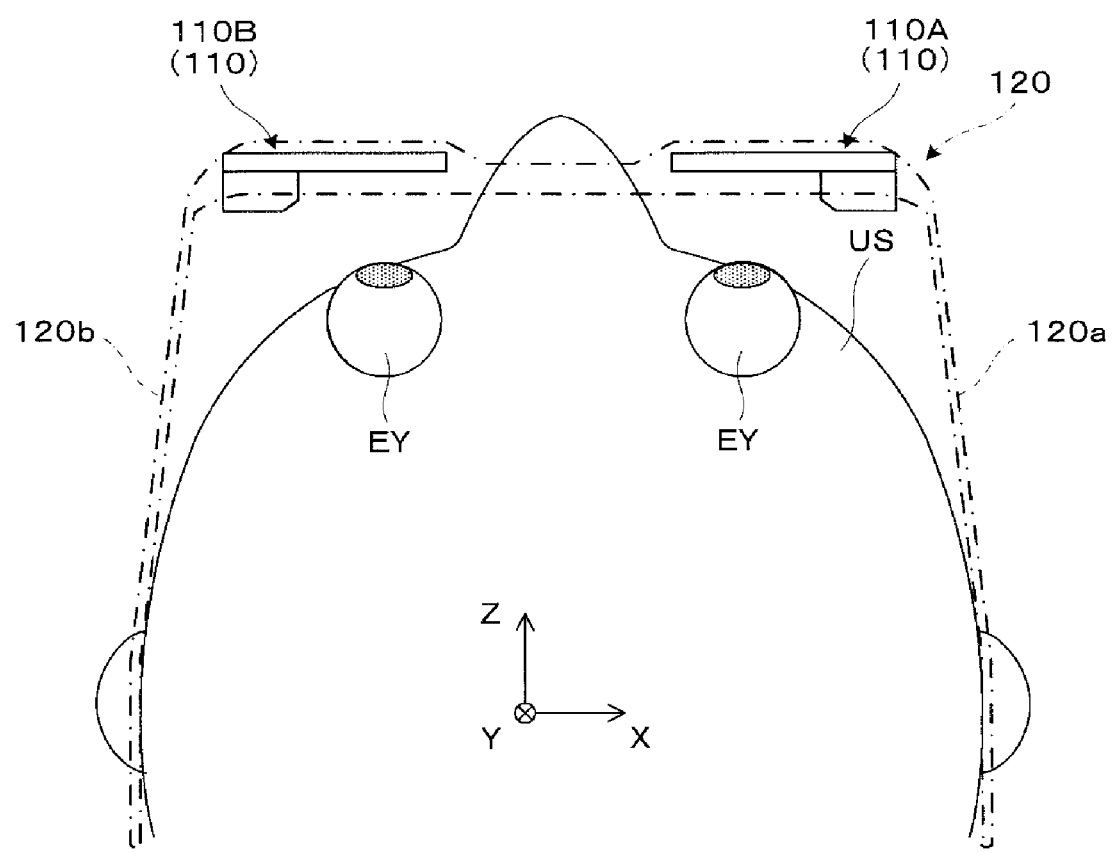
FIG. 1 is a plan view illustrating a worn state of an HMD incorporating a virtual image display device.

FIG. 1 is a diagram illustrating a worn state of a head-mounted display (hereinafter also referred to as an HMD) 200. The HMD 200 allows a user or wearer US wearing the HMD 200 to perceive an image as a virtual image. In FIGS. 1 to 5, X, Y, and Z are orthogonal coordinates, the +X direction corresponds to a horizontal direction in which both eyes EY of the user or wearer US wearing the HMD 200 or the virtual image display device 110 are aligned, the +Y direction corresponds to a downward direction orthogonal to the horizontal direction with respect to the wearer US, and the +Z direction corresponds to a forward or front direction with respect to the wearer US. The ±Y directions are parallel to the vertical axis or the vertical direction.

The HMD 200 includes a virtual image display device 110A for the right eye, a virtual image display device 110B for the left eye, and a support device 120 including a pair of temples 120a and 120b and supporting the pair of virtual image display devices 110A and 110B. The first virtual image display device 110A is disposed to cover the front, that is, the +Z side, of the right eye EY of the wearer US and the second virtual image display device 110B is disposed to cover the +Z side of the left eye EY of the wearer US. The second virtual image display device 110B has the same structure as the first virtual image display device 110A, but with the optical structure of the first virtual image display device 110A reversed in the lateral X direction. The first virtual image display device 110A will be mainly described below.

Figure 3:
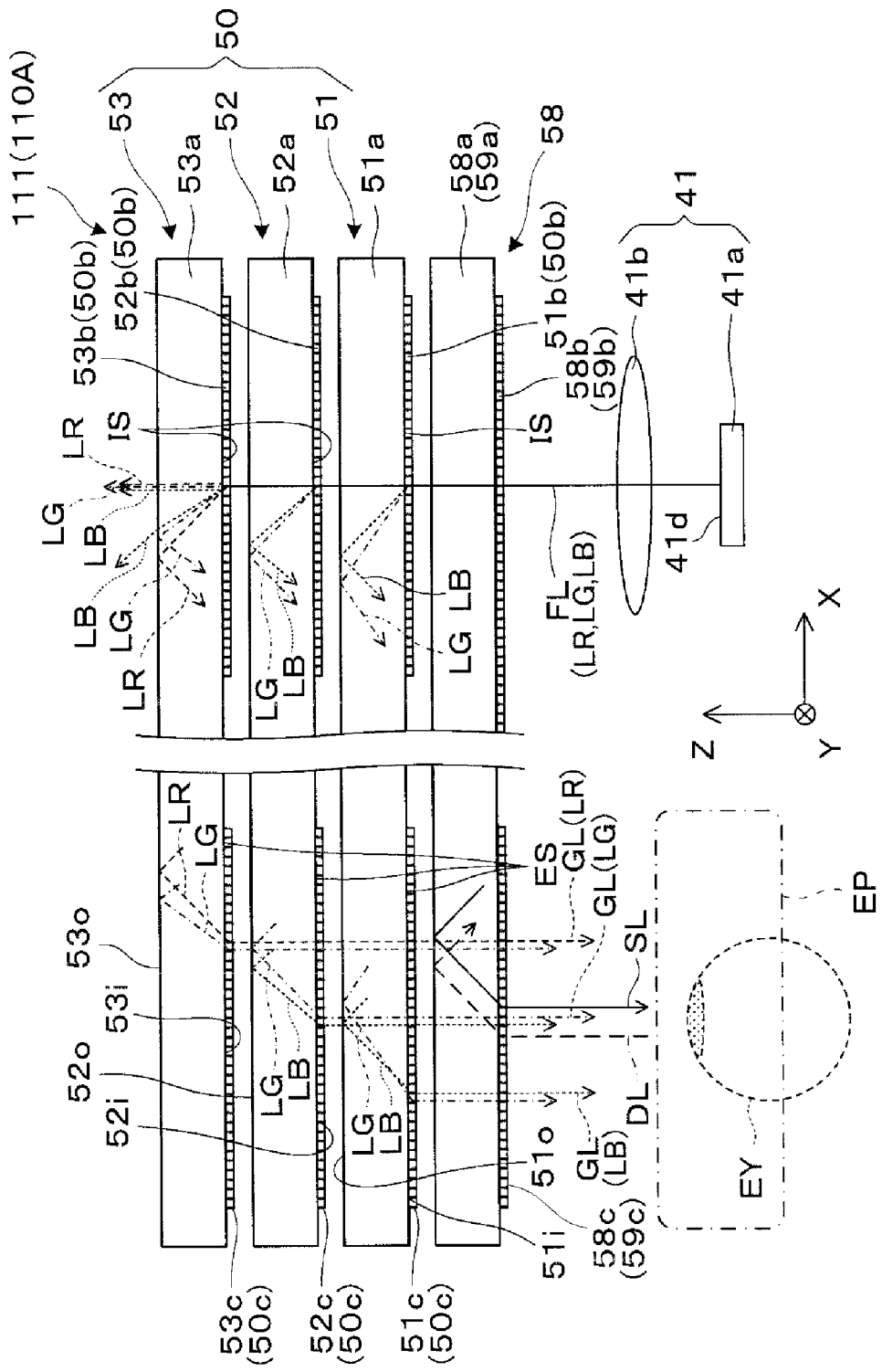
FIG. 3 is a diagram illustrating a projection device.
Figure 4:
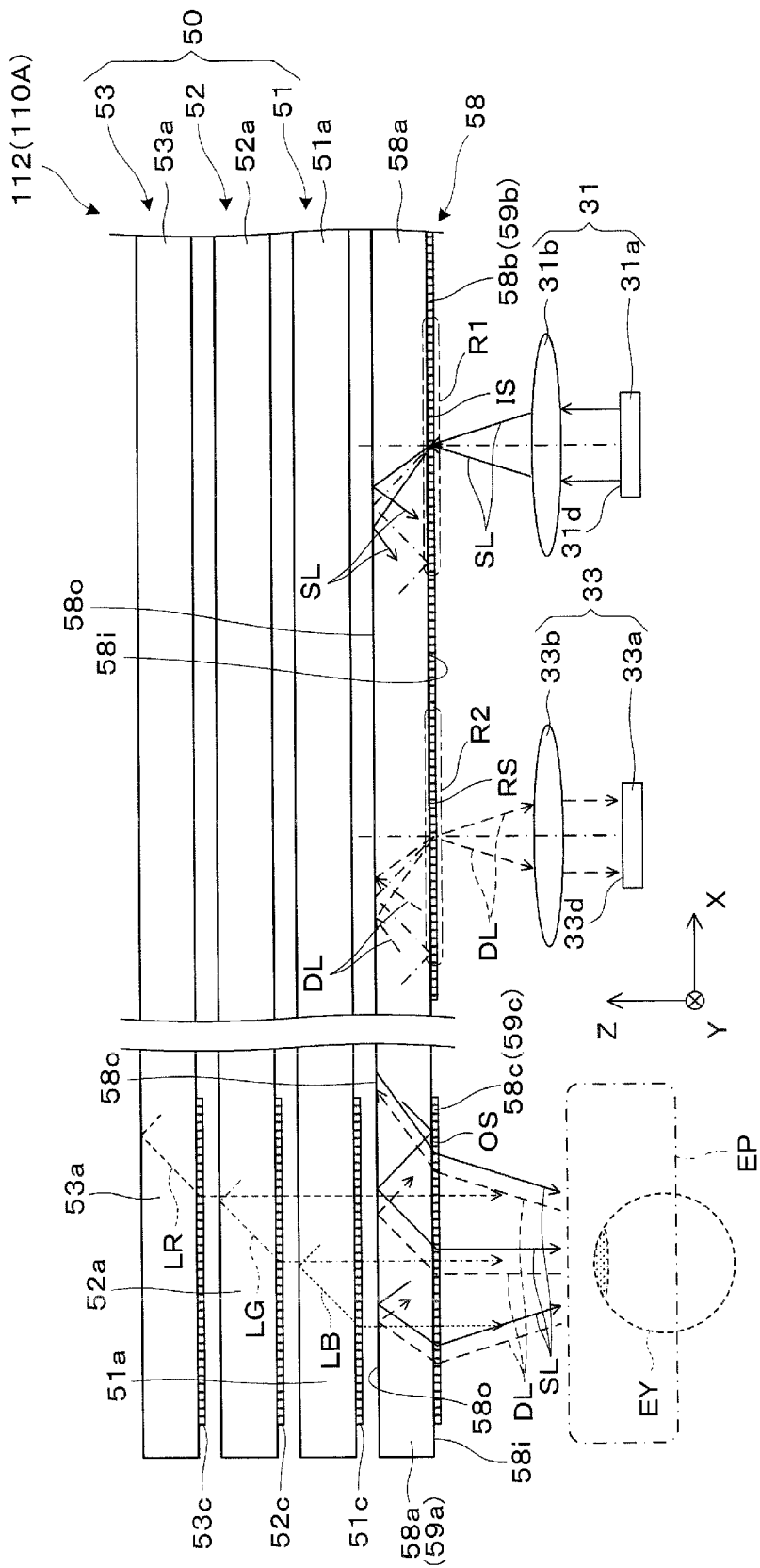
FIG. 4 is a diagram illustrating a line-of-sight detection device.

The first virtual image display device 110A will be described with reference to FIGS. 2 to 4. The virtual image display device 110A shown in FIG. 2 includes a projection device 111, a line-of-sight detection device 112, and a drive control device 80. The projection device 111 displays a virtual image on the eye EY and the line-of-sight detection device 112 detects the orientation of the eye EY, that is, the direction of the line of sight. The virtual image display device 110A partially transmits external light in the visible range corresponding to a wavelength range of, for example, 450 nm to 650 nm and can display a virtual image with the external image as a background. That is, the virtual image display device 110A is a see-through virtual image display device.

The projection device 111 includes an image light generating device 41 that emits image light FL, a first light guide optical system 50 that emits the image light FL in the visible range as display light GL, and a first drive circuit 61 that operates the image light generating device 41. The image light generating device 41 includes a display panel 41a and a collimator lens 41b. The image light generating device 41 is disposed on an eye position EP side, that is, on the −Z side, of the first light guide optical system 50. The first light guide optical system 50 includes three plate-like members extending substantially parallel to the XY plane. The first diffractive light guide member 51 disposed on furthest to the −Z side in the first light guide optical system 50 is for blue display and includes a first light guide plate 51a, a first incident diffraction layer 51b, and a first emitting diffraction layer 51c. The second diffractive light guide member 52 arranged in the middle is for green display and includes a second light guide plate 52a, a second incident diffraction layer 52b, and a second emitting diffraction layer 52c. The third diffractive light guide member 53 disposed furthest to the +Z side is for red display and includes a third light guide plate 53a, a third incident diffraction layer 53b, and a third emitting diffraction layer 53c. Of these layers, the first incident diffraction layer 51b, the second incident diffraction layer 52b, and the third incident diffraction layer 53b each function as a first incident-side diffraction element 50b and deflect the image light FL emitted from the image light generating device 41 such that the image light FL enters the light guide plates 51a, 52a, and 53a of the diffractive light guide members 51, 52, and 53 in a state in which it is guidable therein. The first emitting diffraction layer 51c, the second emitting diffraction layer 52c, and the third emitting diffraction layer 53c each function as a first emitting-side diffraction element 50c and emit the image light FL guided in the light guide plates 51a, 52a, and 53a toward the outside where the eye EY is present. The first to third light guide plates 51a, 52a, and 53a are each also referred to as a first light guide member 50a. The first drive circuit 61 performs signal processing under the control of the drive control device 80 to cause the display panel 41a to perform a display operation. The projection device 111 directs the image light FL generated by the display panel 41a to the eye EY of the wearer US as the display light GL, thereby allowing the wearer US to view the virtual image.

The line-of-sight detection device 112 includes an infrared light emitting device 31 that emits illumination light SL which is infrared light having a specific wavelength in a wavelength range of, for example, 650 nm to 900 nm, an infrared light receiving device 33 that receives measurement light DL which is infrared light having a corresponding wavelength, a second light guide optical system 58 that directs the illumination light SL emitted from the infrared light emitting device 31 to the outside where the eye EY is present and directs the measurement light DL reflected by the eye EY to the infrared light receiving device 33, and a second drive circuit 62 that operates the infrared light emitting device 31 and the infrared light receiving device 33.

The infrared light emitting device 31 includes an infrared light source 31a and a collimator lens 31b. The infrared light receiving device 33 includes an infrared sensor 33a and a collimator lens 33b. The second light guide optical system 58 is a plate-like member extending substantially parallel to the XY plane and is disposed at a position closer to the eye position EP than the first light guide optical system 50 is in a direction normal to the second light guide member 59a. This can prevent the first light guide optical system 50 or the first incident-side diffraction element 50b from attenuating infrared light incident on the eye EY and infrared light reflected by the eye EY and thus can improve the detection accuracy of the line of sight while maintaining display image quality. The second light guide optical system 58 is for infrared measurement and includes a fourth light guide plate 58a, a first infrared diffraction layer 58b, and a second infrared diffraction layer 58c. The first infrared diffraction layer 58b and the second infrared diffraction layer 58c function as a second incident-side diffraction element 59b and a second emitting-side diffraction element 59c, respectively. The fourth light guide plate 58a is also referred to as a second light guide member 59a. The infrared light emitting device 31 is disposed closer to v, that is, closer to the second emitting-side diffraction element 59c, than the image light generating device 41 is in the X direction which is the extension direction of the fourth light guide plate 58a. The infrared light receiving device 33 is disposed closer to the second emitting-side diffraction element 59c than the image light generating device 41 and the infrared light emitting device 31 are in the X direction. The infrared light emitting device 31 and the infrared light receiving device 33 are arranged on the eye position EP side, that is, on the −Z side, of the second light guide optical system 58.

A first region R1 of the first infrared diffraction layer 58b, that is, the second incident-side diffraction element 59b, deflects illumination light SL, which is infrared light emitted from the infrared light emitting device 31, such that the illumination light SL enters the fourth light guide plate 58a of the second light guide optical system 58 in a state in which it is guidable therein. A second region R2 thereof emits measurement light DL, which is infrared light traveling backward from the second infrared diffraction layer 58c, toward the infrared light receiving device 33. The second infrared diffraction layer 58c, that is, the second emitting-side diffraction element 59c, emits the illumination light SL, which has been guided in the fourth light guide plate 58a and propagated to the emitting side, toward the outside where the eye EY is present and deflects the measurement light DL which is infrared light from the eye position EP, that is, infrared light reflected by the eye EY, such that the measurement light DL enters the fourth light guide plate 58a in a state in which it is guidable therein. Here, the incident side is defined with respect to the projection device 111 and indicates being on the first incident diffraction layer 51b side, that is, on the +X side, relative to the first emitting diffraction layer 51c. The emitting side is defined with respect to the projection device 111 and indicates being on the first emitting diffraction layer 51c side, that is, on the −X side, relative to the first incident diffraction layer 51b. The second drive circuit 62 performs signal processing under the control of the drive control device 80 and causes the infrared light source 31a to perform a lighting operation at a predetermined timing while causing the infrared sensor 33a to perform a brightness pattern detection operation. As a whole, the line-of-sight detection device 112 irradiates the eye EY of the wearer US with illumination light SL generated by the infrared light source 31a and detects measurement light DL reflected and returned from the eye EY or the eye position EP irradiated with the illumination light SL to generate a measurement signal and the second drive circuit 62 outputs light intensity pattern information having a correlation with the orientation of the eye EY to the drive control device 80.

Cooperation between the line-of-sight detection of the line-of-sight detection device 112 and the display operation of the projection device 111 will be briefly described below. In the line-of-sight detection device 112, the second drive circuit 62 outputs a measurement signal corresponding to the light intensity pattern of the measurement light DL to the drive control device 80 and the drive control device 80 calculates the azimuth of the line of sight with respect to the vertical Y direction or the horizontal X direction based on the measurement signal or the like from the second drive circuit 62. The drive control device 80 causes the display panel 41a to perform a display operation via the first drive circuit 61, while reflecting the azimuth of the line of sight in the display operation. Specifically, the drive control device 80 converts the azimuth of the line of sight into arrangement information, specifically, pixel position or local partitioned area information, on the display panel 41a based on a conversion table stored in advance. Based on such arrangement information, the drive control device 80 controls the display state of the display panel 41a via the first drive circuit 61 to change the display content, brightness, or resolution. The drive control device 80 can display a mark or other object image, for example, in a local display area on the display panel 41a corresponding to the direction of the line of sight. For example, the drive control device 80 can increase the display brightness in one of the partitioned areas such as the center, right, left, top, and bottom of the display panel 41a corresponding to the direction of the line of sight and decrease the display brightness or turn off the display in partitioned areas away from the direction of the line of sight. For example, the drive control device 80 may increase the display resolution in one of the partitioned areas such as the center, right, left, top, and bottom of the display panel 41a corresponding to the direction of the line of sight and decrease the display resolution in partitioned areas away from the direction of the line of sight.

The optical systems of the projection device 111 will be described in more detail below with reference to FIG. 3. In the image light generating device 41, the display panel 41a is a display device that emits image light FL to form an image corresponding to a virtual image. Specifically, the display panel 41a is, for example, an organic electroluminescence (EL), inorganic EL, or LED array display and forms a color still image or moving image on a two-dimensional display surface 41d. The display panel 41a is not limited to a self-luminous image light generating device and may be made of an LCD or other light modulation element and form an image by illuminating the light modulation element with a light source such as a backlight. As the display panel 41a, a liquid crystal on silicon (LCOS) (trade name), a digital micromirror device, or the like can be used instead of an LCD.

The collimator lens 41b is a projection optical system including a lens for collimating incident light and collimates the image light FL emitted from the display surface 41d of the display panel 41a such that it has a predetermined light beam width and emits the collimated image light FL toward the first to third incident diffraction layers 51b to 53b provided on the first to third diffractive light guide members 51 to 53 in a state with an inclination angle corresponding to each pixel position.

In the first light guide optical system 50, the first light guide plate 51a of the first diffractive light guide member 51 for blue light is a member formed of a parallel flat plate and has a pair of flat surfaces 51i and 51o extending parallel to the XY plane. The extension direction or the longitudinal direction of the first light guide plate 51a is the ±X direction. Here, the extension direction is a direction in which the first light guide plate 51a mainly extends and corresponds to a direction from an incident surface IS to an emitting surface ES of the first light guide plate 51a. The first incident diffraction layer 51b is provided on the eye EY side, that is, on the −Z side, of a right region or an incident side region, that is, a +X side region, of the first diffractive light guide member 51 as a structure associated with the incident surface IS that is a part or an extension of the flat surface 51i. The first emitting diffraction layer 51c is also provided on the eye EY side, that is, on the −Z side, of a left region or an emitting side region, that is, a −X side region, of the first diffractive light guide member 51 as a structure associated with the emitting surface ES that is a part or an extension of the flat surface 51i. The pair of flat surfaces 51i and 51o of the first light guide plate 51a function as total internal reflection surfaces that totally reflect and guide the blue image light LB, which has been directed into the first light guide plate 51a via the first incident diffraction layer 51b, and thus guide the image light LB with almost no loss. For example, the first light guide plate 51a has a thickness of about 0.3 to 2 mm and is made of resin or glass having high light transmittance.

The first incident diffraction layer 51b is formed in a rectangular area parallel to the XY plane at a position facing the collimator lens 41b through the second light guide optical system 58. The first incident diffraction layer 51b directs the image light LB, which has been emitted from the display surface 41d of the display panel 41a and passed through the collimator lens 41b, into the first light guide plate 51a. The first incident diffraction layer 51b may be formed integrally with the first light guide plate 51a and may also be formed separately from the first light guide plate 51a such that it is joined or attached to the incident surface IS of the first light guide plate 51a. The first incident diffraction layer 51b injects the blue image light LB incident on it into the first light guide plate 51a by diffraction such that it propagates in the first light guide plate 51a. Specifically, the first incident diffraction layer 51b is, for example, a surface-relief diffraction grating. The first incident diffraction layer 51b includes a large number of protrusions or grooves linearly extending in the vertical Y direction and is formed with a pattern that is periodic in the horizontal X direction. The grating period (pitch) and grating height of the pattern formed on the first incident diffraction layer 51b are constant. The grating period of this pattern is set to make the angle of reflection or the angle of incidence in the first light guide plate 51a greater than a critical angle determined by the refractive index of the first light guide plate 51a such that the blue image light LB propagates in the first light guide plate 51a by total internal reflection. The first incident diffraction layer 51b is not limited to one having periodic concavities and convexities exposed on the surface and may be one having an embedded interface corresponding to periodic concavities and convexities.

The first emitting diffraction layer 51c is formed in a rectangular area parallel to the XY plane at a position facing the eye position EP on the −X side of the first incident diffraction layer 51b. The first emitting diffraction layer 51c extracts the image light LB traveling in the −X direction as a whole in the first light guide plate 51a out of the first light guide plate 51a and emits the image light LB toward the eye position EP where the eye EY of the wearer US is disposed. The first emitting diffraction layer 51c may be formed integrally with the first light guide plate 51a and may also be formed separately from the first light guide plate 51a such that it is joined or attached to the emitting surface ES of the first light guide plate 51a. When the blue image light LB propagates while being reflected by the flat surfaces 51i and 51o of the first light guide plate 51a, the first emitting diffraction layer 51c transmits the image light LB by diffraction at a certain location while restoring angle information before being incident on the first incident diffraction layer 51b. Specifically, the first emitting diffraction layer 51c is, for example, a surface-relief diffraction grating. The first emitting diffraction layer 51c includes a large number of protrusions or grooves linearly extending in the vertical Y direction and is formed with a pattern that is periodic in the horizontal X direction. The grating period (pitch) and grating height of the pattern formed on the first emitting diffraction layer 51c are constant. The grating period of this pattern in the X direction is made to match the grating period of the first incident diffraction layer 51b in the X direction. The first emitting diffraction layer 51c is not limited to one having periodic concavities and convexities exposed on the surface and may be one having an embedded interface corresponding to periodic concavities and convexities.

Guidance of the image light LB and formation of a virtual image using the first diffractive light guide member 51 will be described below. The display panel 41a forms a color still image or moving image on the two-dimensional display surface 41d. The blue image light LB from the display surface 41d is incident on the first incident diffraction layer 51b at an angle corresponding to each position in the X direction on the display surface 41d in a plan view as viewed in the +Y direction by passing through the collimator lens 41b and is diffracted in a direction at an angle corresponding to the pitch of the pattern formed on the first incident diffraction layer 51b and then propagates while being totally reflected in the first light guide plate 51a and travels in the −X direction as a whole. The blue image light LB propagating in the −X direction as a whole in the first light guide plate 51a is diffracted by the first emitting diffraction layer 51c and emitted toward the eye EY from a position on the first emitting diffraction layer 51c. The image light LB emitted from the first emitting diffraction layer 51c, that is, the display light GL, reproduces the angular state when emitted from the display surface 41d with respect to the +X direction while enlarging the pupil size in the +X direction. That is, the image light LB passes through the first diffractive light guide member 51 to enlarge the horizontal pupil size, such that a virtual image formed by the blue image light LB from the display panel 41a can be observed even if the position of the eye EY is significantly displaced horizontally.

The second light guide plate 52a of the second diffractive light guide member 52 for green light is a member similar to the first light guide plate 51a of the first diffractive light guide member 51 and has a pair of flat surfaces 52i and 52o extending parallel to the XY plane. The second incident diffraction layer 52b is provided on the eye EY side, that is, on the −Z side, of an incident side region, that is, a +X side region, of the second diffractive light guide member 52 as a structure associated with an incident surface IS that is a part or an extension of the flat surface 52i. The second emitting diffraction layer 52c is also provided on the eye EY side, that is, on the −Z side, of an emitting side region, that is, a −X side region, of the second diffractive light guide member 52 as a structure associated with an emitting surface ES that is a part or an extension of the flat surface 52i. The pair of flat surfaces 52i and 52o of the second light guide plate 52a function as total internal reflection surfaces that totally reflect and guide the green image light LG, which has been directed into the second light guide plate 52a via the second incident diffraction layer 52b, and thus guide the image light LG with almost no loss.

The second incident diffraction layer 52b is formed in a rectangular area parallel to the XY plane at a position facing the collimator lens 41b through the second light guide optical system 58 and the first diffractive light guide member 51. The second incident diffraction layer 52b directs the image light LG, which has been emitted from the display panel 41a and passed through the collimator lens 41b, into the second light guide plate 52a. Similar to the first incident diffraction layer 51b of the first diffractive light guide member 51, the second incident diffraction layer 52b may be formed integrally with the second light guide plate 52a and may also be formed separately from the second light guide plate 52a such that it is joined or attached to the incident surface IS of the second light guide plate 52a. The second incident diffraction layer 52b injects the green image light LG incident on it into the second light guide plate 52a by diffraction such that it propagates in the second light guide plate 52a. Specifically, the second incident diffraction layer 52b is, for example, a surface-relief diffraction grating. The grating period of the pattern formed on the second incident diffraction layer 52b is set to make the angle of reflection or the angle of incidence in the second light guide plate 52a greater than a critical angle determined by the refractive index of the second light guide plate 52a such that the green image light LG propagates in the second light guide plate 52a by total internal reflection. The second incident diffraction layer 52b is not limited to one having periodic concavities and convexities exposed on the surface and may be one having an embedded interface corresponding to periodic concavities and convexities.

The second emitting diffraction layer 52c is formed in a rectangular area parallel to the XY plane at a position facing the eye position EP. The second emitting diffraction layer 52c extracts the image light LG traveling in the −X direction as a whole in the second light guide plate 52a out of the second light guide plate 52a and emits the image light LG toward the eye position EP where the eye EY of the wearer US is disposed. Similar to the first emitting diffraction layer 51c of the first diffractive light guide member 51, the second emitting diffraction layer 52c may be formed integrally with the second light guide plate 52a and may also be formed separately from the second light guide plate 52a such that it is joined or attached to the emitting surface ES of the second light guide plate 52a. When the green image light LG propagates while being reflected by the flat surfaces 52i and 52o of the second light guide plate 52a, the second emitting diffraction layer 52c transmits the image light LG by diffraction at a certain location while restoring angle information before being incident on the second incident diffraction layer 52b. Specifically, the second emitting diffraction layer 52c is, for example, a surface-relief diffraction grating. The grating period of the pattern formed on the second emitting diffraction layer 52c is made to match the grating period of the second incident diffraction layer 52b in the X direction. The second emitting diffraction layer 52c is not limited to one having periodic concavities and convexities exposed on the surface and may be one having an embedded interface corresponding to periodic concavities and convexities.

Guidance of the green image light LG and formation of a virtual image using the second diffractive light guide member 52 are similar to guidance of the blue image light LB and formation of a virtual image using the first diffractive light guide member 51 and thus a detailed description is omitted.

The third light guide plate 53a of the third diffractive light guide member 53 for red light is a member similar to the first light guide plate 51a of the first diffractive light guide member 51 and has a pair of flat surfaces 53i and 53o extending parallel to the XY plane. The third incident diffraction layer 53b is provided on the eye EY side, that is, on the −Z side, of an incident side region, that is, a +X side region, of the third diffractive light guide member 53 as a structure associated with an incident surface IS that is a part or an extension of the flat surface 53i. The third emitting diffraction layer 53c is also provided on the eye EY side, that is, on the −Z side, of a an emitting side region, that is, a −X side region, of the third diffractive light guide member 53 as a structure associated with an emitting surface ES that is a part or an extension of the flat surface 53i. The pair of flat surfaces 53i and 53o of the third light guide plate 53a function as total internal reflection surfaces that totally reflect and guide the red image light LR, which has been directed into the third light guide plate 53a via the third incident diffraction layer 53b, and thus guide the image light LR with almost no loss.

The third incident diffraction layer 53b is formed in a rectangular area parallel to the XY plane at a position facing the collimator lens 41b through the second light guide optical system 58, the first diffractive light guide member 51, and the second diffractive light guide member 52. The third incident diffraction layer 53b directs the image light LR, which has been emitted from the display panel 41a and passed through the collimator lens 41b, into the third light guide plate 53a. Similar to the first incident diffraction layer 51b of the first diffractive light guide member 51, the third incident diffraction layer 53b may be formed integrally with the third light guide plate 53a and may also be formed separately from the third light guide plate 53a such that it is joined or attached to the incident surface IS of the third light guide plate 53a. The third incident diffraction layer 53b injects the red image light LR incident on it into the third light guide plate 53a by diffraction such that it propagates in the third light guide plate 53a. Specifically, the third incident diffraction layer 53b is, for example, a surface-relief diffraction grating. The grating period of the pattern formed on the third incident diffraction layer 53b is set to make the angle of reflection or the angle of incidence in the third incident diffraction layer 53b greater than a critical angle determined by the refractive index of the third incident diffraction layer 53b such that the red image light LR propagates in the third light guide plate 53a by total internal reflection. The third incident diffraction layer 53b is not limited to one having periodic concavities and convexities exposed on the surface and may be one having an embedded interface corresponding to periodic concavities and convexities.

The third emitting diffraction layer 53c is formed in a rectangular area parallel to the XY plane at a position facing the eye position EP. The third emitting diffraction layer 53c extracts the image light LR traveling in the −X direction as a whole in the third light guide plate 53a out of the third light guide plate 53a and emits the image light LR toward the eye position EP where the eye EY of the wearer US is disposed. Similar to the first emitting diffraction layer 51c of the first diffractive light guide member 51, the third emitting diffraction layer 53c may be formed integrally with the third light guide plate 53a and may also be formed separately from the third light guide plate 53a such that it is joined or attached to the emitting surface ES of the third light guide plate 53a. When the red image light LR propagates while being reflected by the flat surfaces 53i and 53o of the third light guide plate 53a, the third emitting diffraction layer 53c transmits the image light LR by diffraction at a certain location while restoring angle information before being incident on the third incident diffraction layer 53b. Specifically, the third emitting diffraction layer 53c is, for example, a surface-relief diffraction grating. The grating period of the pattern formed on the third emitting diffraction layer 53c is made to match the grating period of the third incident diffraction layer 53b in the X direction. The third emitting diffraction layer 53c is not limited to one having periodic concavities and convexities exposed on the surface and may be one having an embedded interface corresponding to periodic concavities and convexities.

Guidance of the red image light LR and formation of a virtual image using the third diffractive light guide member 53 are similar to guidance of the blue image light LB and formation of a virtual image using the first diffractive light guide member 51 and thus a detailed description is omitted.

On the incident side, the visible image light FL passes through the first infrared diffraction layer 58b of the second light guide optical system 58 for infrared with little loss. Because the pitch of the diffraction grating of the first infrared diffraction layer 58b of the second light guide optical system 58 is relatively larger than the pitch of the diffraction gratings of the first to third incident diffraction layers 51b, 52b, and 53b, the visible image light FL does not satisfy the total internal reflection condition of the fourth light guide plate 58a and passes through the fourth light guide plate 58a, deviating from the optical path thereof, although it is partially diffracted by the first infrared diffraction layer 58b, that is, the second incident-side diffraction element 59b, depending on its wavelength.

Of the image light FL that has passed through the second light guide optical system 58 and been incident on the first incident diffraction layer 51b of the first diffractive light guide member 51, the blue image light LB is efficiently diffracted by the first incident diffraction layer 51b and propagates in the first light guide plate 51a, but is partially transmitted through the first incident diffraction layer 51b. Of the image light FL incident on the first incident diffraction layer 51b, the green image light LG is partially diffracted by the first incident diffraction layer 51b and propagates in the first light guide plate 51a, but mostly passes through the first incident diffraction layer 51b. Of the image light FL incident on the first incident diffraction layer 51b, the red image light LR has no diffraction resolution and passes through the first light guide plate 51a.

The green image light LG that has passed through the second light guide optical system 58 and the first diffractive light guide member 51 and been incident on the second incident diffraction layer 52b of the second diffractive light guide member 52 is efficiently diffracted by the second incident diffraction layer 52b and propagates in the second light guide plate 52a, but is partially transmitted through the second incident diffraction layer 52b. On the other hand, the blue image light LB incident on the second incident diffraction layer 52b is diffracted by the second incident diffraction layer 52b, but its diffraction angle is small, leading to a large propagation loss. Of the image light FL incident on the second incident diffraction layer 52b, the red image light LR is partially diffracted by the second incident diffraction layer 52b and propagates in the second light guide plate 52a, but mostly passes through the second incident diffraction layer 52b. The diffraction efficiency of the red image light LR propagating in the second light guide plate 52a is much lower than the diffraction efficiency of the green image light LG.

The red image light LR that has passed through the second light guide optical system 58, the first diffractive light guide member 51, and the second diffractive light guide member 52 and been incident on the third incident diffraction layer 53b of the third diffractive light guide member 53 is efficiently diffracted by the third incident diffraction layer 53b and propagates in the third light guide plate 53a, but is partially transmitted through the third incident diffraction layer 53b. On the other hand, the green image light LG incident on the third incident diffraction layer 53b is diffracted by the third incident diffraction layer 53b, but its diffraction angle is small, leading to a large propagation loss. The blue image light LB incident on the third incident diffraction layer 53b is diffracted by the third incident diffraction layer 53b, but its diffraction angle is much smaller and does not satisfy the total internal reflection condition of the third light guide plate 53a and passes through the third light guide plate 53a.

On the emitting side, the blue image light LB emitted from the first emitting diffraction layer 51c of the first diffractive light guide member 51 is partially diffracted by the second infrared diffraction layer 58c of the second light guide optical system 58, that is, the second emitting-side diffraction element 59c, but mostly passes through the second emitting-side diffraction element 59c. The green image light LG emitted from the second emitting diffraction layer 52c of the second diffractive light guide member 52 is partially diffracted by the first emitting diffraction layer 51c of the first diffractive light guide member 51 and the second emitting-side diffraction element 59c of the second light guide optical system 58, but mostly passes through the first emitting diffraction layer 51c and the second emitting-side diffraction element 59c. The red image light LR emitted from the third emitting diffraction layer 53c of the third diffractive light guide member 53 is partially diffracted by the first emitting diffraction layer 51c of the first diffractive light guide member 51, the second emitting diffraction layer 52c of the second diffractive light guide member 52, and the second emitting-side diffraction element 59c of the second light guide optical system 58, but mostly passes through the first emitting diffraction layer 51c, the second emitting diffraction layer 52c, and the second emitting-side diffraction element 59c.

The optical system of the line-of-sight detection device 112 will be described in more detail below with reference to FIG. 4. In the infrared light emitting device 31, the infrared light source 31a is an optical device that emits illumination light SL which is infrared light. Specifically, the infrared light source 31a is, for example, an LED array and forms a predetermined two-dimensional infrared emission pattern on a light emitting surface 31d. The infrared light source 31a is not limited to one that emits light by itself and may be a combination of a light source and a filter as long as it can form a discrete light emission pattern or a continuous light emission pattern.

The collimator lens 31b includes a lens for collimating incident light and collimates the illumination light SL emitted from the light emitting surface 31d of the infrared light source 31a such that it has a predetermined light beam width and emits the collimated illumination light SL toward the first infrared diffraction layer 58b, that is, the second incident-side diffraction element 59b, provided on the second light guide optical system 58 in a state with an inclination angle corresponding to each pattern position.

In the infrared light receiving device 33, the infrared sensor 33a is an optical device that detects the measurement light DL which is infrared light. Specifically, the infrared sensor 33a is, for example, a photodiode array and detects a two-dimensional infrared projection pattern formed on a photosensitive surface 33d. The infrared sensor 33a may be any sensor that can detect a discrete brightness pattern or a continuous brightness pattern.

The collimator lens 33b includes a lens for collimating incident light and converges parallel components of the infrared measurement light DL emitted from the first infrared diffraction layer 58b onto the photosensitive surface 33d. At this time, the measurement light DL is incident on the photosensitive surface 33d at a position thereof corresponding to the inclination angle of the measurement light DL with respect to the fourth light guide plate 58a. That is, the infrared brightness pattern formed on the photosensitive surface 33d reflects the distribution of the inclination angle state of the measurement light DL.

In the second light guide optical system 58, the fourth light guide plate 58a is a member formed of a parallel flat plate and has a pair of flat surfaces 58i and 58o extending parallel to the XY plane. The extension direction of the fourth light guide plate 58a is the ±X direction. Here, the extension direction is a direction in which the fourth light guide plate 58a mainly extends and corresponds to a direction from an incident surface IS to an objective surface OS of the fourth light guide plate 58a via a light receiving surface RS. The first infrared diffraction layer 58b is provided on the eye EY side, that is, on the −Z side, of a right region or an incident side region, that is, a +X side region, of the second light guide optical system 58 as a structure associated with the incident surface IS and the light receiving surface RS that are each a part of the flat surface 58i. A second infrared diffraction layer 58c is also provided on the eye EY side, that is, on the −Z side, of a left region or an emitting side region, that is, a −X side region, of the second light guide optical system 58 as a structure associated with the objective surface OS that is a part or an extension of the flat surface 58i. The pair of flat surfaces 58i and 58o of the fourth light guide plate 58a function as total internal reflection surfaces that totally reflect and guide the illumination light SL in the infrared range, which has been directed into the fourth light guide plate 58a via the first infrared diffraction layer 58b, and thus guide the illumination light SL with almost no loss. For example, the fourth light guide plate 58a has a thickness of about 1 to 2 mm and is made of resin or glass having high light transmittance.

The first infrared diffraction layer 58b, that is, the second incident-side diffraction element 59b, is provided in a rectangular area parallel to the XY plane facing the infrared light emitting device 31, the infrared light receiving device 33, and the image light generating device 41. The second incident-side diffraction element 59b may be formed integrally with the fourth light guide plate 58a and may also be formed separately from the fourth light guide plate 58a such that it is joined or attached to the incident surface IS of the fourth light guide plate 58a. In the second incident-side diffraction element 59b, the first region R1 faces the collimator lens 31b and directs the illumination light SL, which has been emitted from the light emitting surface 31d of the infrared light source 31a and passed through the collimator lens 31b, into the fourth light guide plate 58a. The second region R2 extracts the measurement light DL traveling in the +X direction as a whole in the fourth light guide plate 58a out of the fourth light guide plate 58a and emits the measurement light DL toward the collimator lens 33b such that it is incident on the infrared sensor 33a. The second incident-side diffraction element 59b injects the infrared illumination light SL incident on the first region R1 into the fourth light guide plate 58a by diffraction such that it propagates in the fourth light guide plate 58a or extracts the measurement light DL, which has traveled backward in the fourth light guide plate 58a and been incident on the second region R2, out of the fourth light guide plate 58a by diffraction. Specifically, the second incident-side diffraction element 59b is, for example, a surface-relief diffraction grating. The second incident-side diffraction element 59b includes a large number of protrusions or grooves linearly extending in the vertical Y direction and is formed with a pattern that is periodic in the horizontal X direction. The grating period (pitch) and grating height of the pattern formed on the second incident-side diffraction element 59b are constant. The grating period of this pattern is set to make the angle of reflection or the angle of incidence in the fourth light guide plate 58a greater than a critical angle determined by the refractive index of the fourth light guide plate 58a such that the illumination light SL or the measurement light DL propagates in the fourth light guide plate 58a by total internal reflection. The second incident-side diffraction element 59b is not limited to one having periodic concavities and convexities exposed on the surface and may be one having an embedded interface corresponding to periodic concavities and convexities.

The second infrared diffraction layer 58c, that is, the second emitting-side diffraction element 59c, is formed in a rectangular area parallel to the XY plane at a position facing the eye position EP. The second emitting-side diffraction element 59c extracts the illumination light SL traveling in the −X direction as a whole in the fourth light guide plate 58a out of the fourth light guide plate 58a by diffraction and emits the illumination light SL toward the eye position EP where the eye EY of the wearer US is disposed and injects the measurement light DL, which has been reflected at the eye position EP and incident on the second infrared diffraction layer 58c, into the fourth light guide plate 58a by diffraction such that it travels in the +X direction as a whole. The second emitting-side diffraction element 59c may be formed integrally with the fourth light guide plate 58a and may also be formed separately from the fourth light guide plate 58a such that it is joined or attached to the objective surface OS of the fourth light guide plate 58a. Specifically, the second emitting-side diffraction element 59c is, for example, a surface-relief diffraction grating. The second emitting-side diffraction element 59c includes a large number of protrusions or grooves linearly extending in the vertical Y direction and is formed with a pattern that is periodic in the horizontal X direction. The grating period (pitch) and grating height of the pattern formed on the second emitting-side diffraction element 59c are constant. The grating period of this pattern is made to match the grating period of the second incident-side diffraction element 59b in the X direction. The second emitting-side diffraction element 59c is not limited to one having periodic concavities and convexities exposed on the surface and may be one having an embedded interface corresponding to periodic concavities and convexities.

Part of the illumination light SL incident on the first region R1 of the second incident-side diffraction element 59b of the second light guide optical system 58 passes through the first diffractive light guide member 51, the second diffractive light guide member 52, and the third diffractive light guide member 53 while traveling straight without being diffracted by the second incident-side diffraction element 59b. In the second light guide optical system 58, the measurement light DL incident on the second emitting-side diffraction element 59c partially passes through the second emitting-side diffraction element 59c and is incident on the first emitting diffraction layer 51c, the second emitting diffraction layer 52c, and the third emitting diffraction layer 53c, but is hardly coupled to the first diffractive light guide member 51, the second diffractive light guide member 52, and the third diffractive light guide member 53 because it has no diffraction resolution or a low diffraction efficiency.

Figure 5:
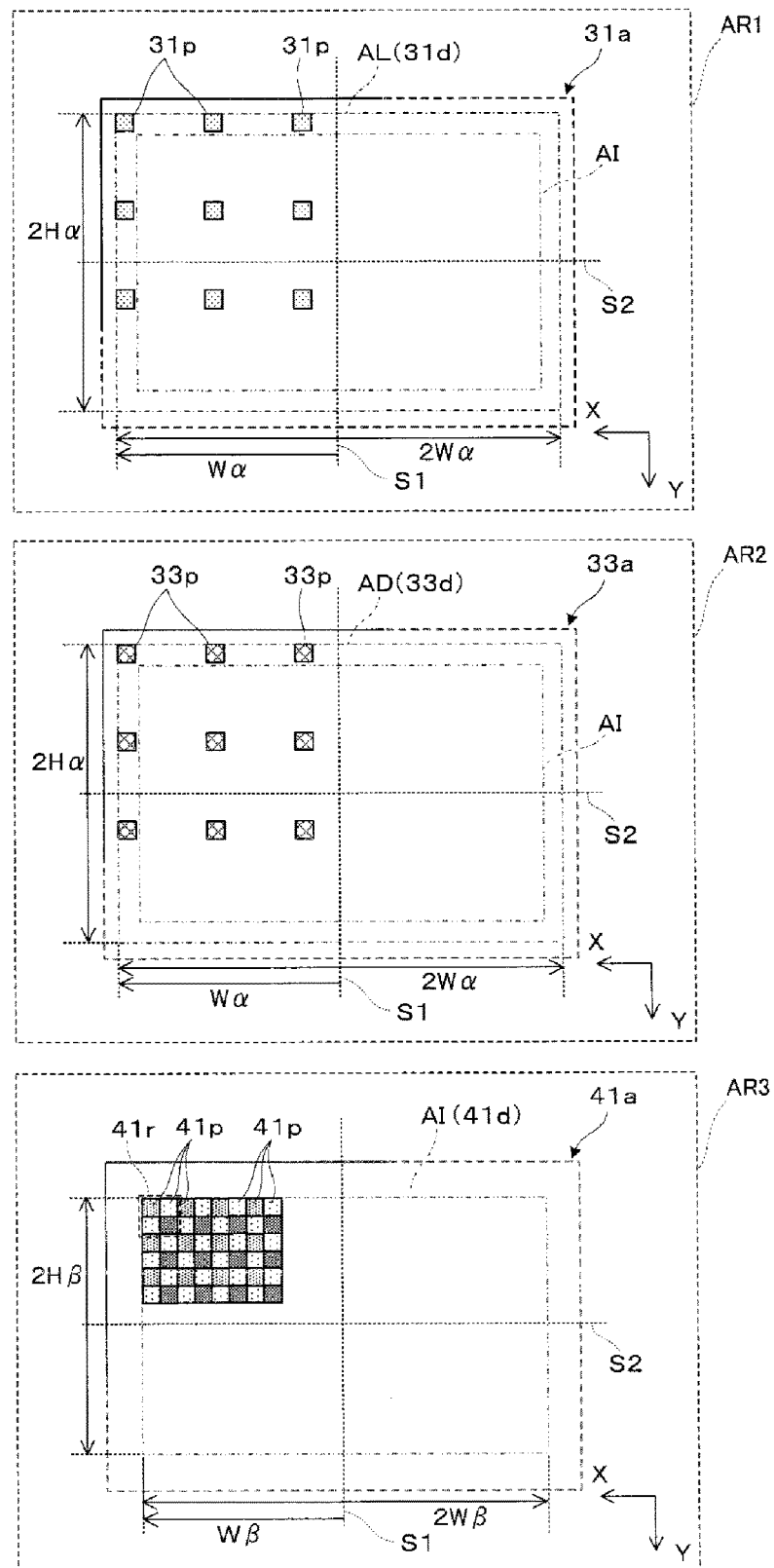
FIG. 5 is a diagram illustrating states of an infrared light source, an infrared sensor, and a display panel.

FIG. 5 is a diagram illustrating specific examples of the infrared light source 31a, the infrared sensor 33a, and the display panel 41a. In FIG. 5, an area AR1 is a front view of the light emitting surface 31d of the infrared light source 31a, an area AR2 is a front view of the photosensitive surface 33d of the infrared sensor 33a, and an area AR3 is a front view of the display surface 41d of the display panel 41a. FIG. 5 shows an example in which the infrared light source 31a emits light in a discrete light emission pattern and an example in which the infrared sensor 33a detects a discrete brightness pattern. In the areas AR1 and AR2 in FIG. 5, an effective area AI of a visible light image is shown superimposed on effective areas AL and AD of the infrared light, respectively.

Figure 2:
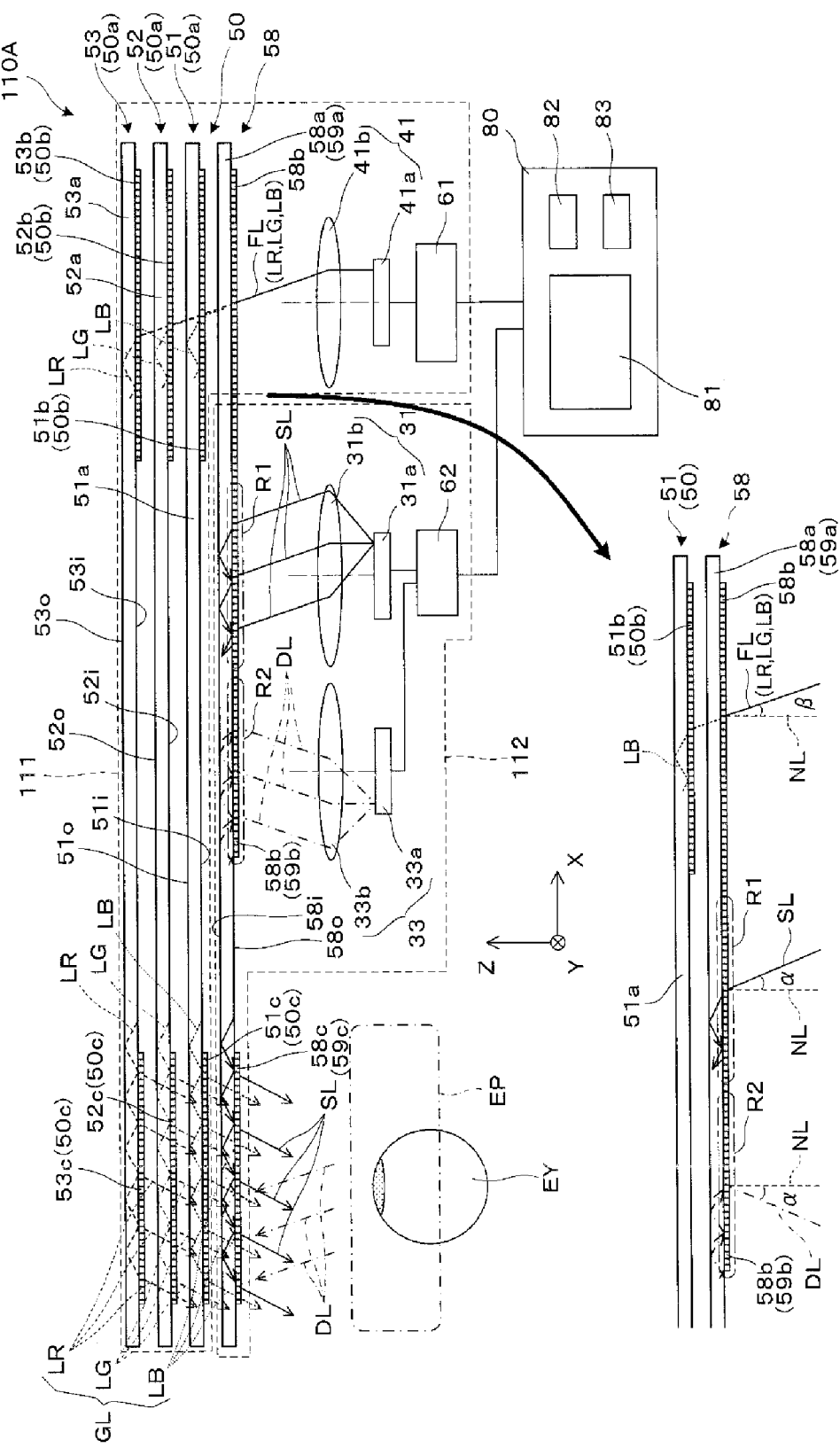
FIG. 2 is a plan view of a virtual image display device of a first embodiment.

The effective area AL which is a light emitting area of the infrared light emitting device 31 shown in FIG. 2 is larger than the effective area AI which is a display area of the image light generating device 41. That is, the light emitting area of the infrared light emitting device 31 is larger than the display area of the image light generating device 41. The effective area AD which is a light receiving area of the infrared light receiving device 33 is larger than the effective area AI which is the display area of the image light generating device 41. That is, the light receiving area of the infrared light receiving device 33 is larger than the display area of the image light generating device 41. The effective area AL of the infrared light emitting device 31 is preferably substantially the same size as the effective area AD of the infrared light receiving device 33. A horizontal width $2W\alpha$ in the X direction of the effective areas AL and AD of the infrared light is one size larger than a horizontal width $2W\beta$ in the X direction of the effective area AI of the visible light image. In the shown example, a vertical width $2H\alpha$ in the Y direction of the effective areas AL and AD of the infrared light is one size larger than a vertical width $2H\beta$ in the Y direction of the effective area AI of the visible light image. As a result, a field angle or viewing angle of the illumination light SL and the measurement light DL of the effective areas AL and AD is relatively wider than a field angle or viewing angle of the image light FL. The effective areas AL, AD, and AI are device areas of the devices 31, 33, and 41 and are arranged substantially symmetrically with respect to reference lines S1 and S2 that pass through the center and extend parallel respectively to the Y and X directions. Here, the viewing angle corresponds to a field angle for the image light generating device 41 and indicates the spread of the azimuth of infrared light for the infrared light emitting device 31 and the infrared light receiving device 33.

Light emitting points 31p which are light emitting elements are arranged in a grid at predetermined intervals in the effective area AL of the light emitting surface 31d of the infrared light source 31a. Detection points 33p which are light receiving elements are arranged in a grid at predetermined intervals in the effective area AD of the photosensitive surface 33d of the infrared sensor 33a. Pixels 41r or pixel points 41p in the display area are arranged in a grid in the effective area AI of the display surface 41d of the display panel 41a.

The number or density of light emitting points 31p of the infrared light source 31a is smaller than the number or density of pixels 41r of the display panel 41a. The number or density of detection points 33p of the infrared sensor 33a is also smaller than the number or density of pixels 41r of the display panel 41a. As a result, the number of detection points 33p can be reduced in accordance with the detection resolution of the line of sight, the structure of the infrared light receiving device 33 can be simplified, and an increase in the amount of information processing can be limited. Each pixel 41r includes, for example, four pixel points 41p. Specifically, each pixel 41r includes one pixel point 41p for red, one pixel point 41p for blue, and two pixel points 41p for green. The number of light emitting points 31p of the infrared light source 31a is preferably substantially the same as the number of detection points 33p of the infrared sensor 33a. Specifically, the light emitting points 31p are discretely arranged in the effective area AL, for example, in a 19×11 array. The detection points 33p are discretely arranged in the effective area AD, for example, in a 19×11 array. The pixels 41r are discretely arranged in the effective area AI, for example, in a 1920×1080 array. The pixels 41r are RGB pixel groups arranged two-dimensionally. The light emitting points 31p and the detection points 33p can be changed in number and size as appropriate, and for example, the light emitting points 31p and the detection points 33p may be increased in size and arranged continuously rather than being arranged discretely as described above.

The maximum value of an angle $\alpha$ formed between the measurement light DL that the second incident-side diffraction element 59b has deflected toward the infrared light receiving device 33 and a normal line NL of the second incident-side diffraction element 59b with respect to the light guiding direction shown in FIG. 2 is greater than the maximum value of an angle $\beta$ formed between image light FL incident on the first incident-side diffraction element 50b and a normal line NL of the first incident-side diffraction element 50b. Here, the normal line NL of the second incident-side diffraction element 59b corresponds to a normal line of the infrared light receiving device 33. The normal line of the first incident-side diffraction element 50b or the second incident-side diffraction element 59b is a normal line to the flat surfaces along which the diffraction elements extend as a whole. In the infrared light receiving device 33, a length $W\alpha$ from the reference line S1 passing through the center of the effective area AD to the periphery of the effective area AD in the horizontal X direction corresponds to the maximum value of the angle $\alpha$ formed between the measurement light DL and the normal line NL of the second incident-side diffraction element 59b as shown in FIGS. 2 and 5. The maximum value of the angle $\alpha$ corresponds to the field angle or viewing angle of the measurement light DL received by the infrared light receiving device 33. In the image light generating device 41, a length $W\beta$ from the reference line S1 passing through the center of the effective area AI to the periphery of the effective area AI in the X direction corresponds to the maximum value of the angle β formed between the image light FL and the normal line NL of the first incident-side diffraction element 50b. The maximum value of the angle β corresponds to the field angle or viewing angle of the image light FL emitted from the image light generating device 41. The angles α and β have a relationship of α>β.

Similarly, the relationship of α>β holds for the maximum value of an angle α formed between the illumination light SL and the normal line NL of the second incident-side diffraction element 59b in the infrared light emitting device 31 and the maximum value of an angle β formed between the image light FL and the normal line NL of the first incident-side diffraction element 50b in the image light generating device 41. While the angles α and β in the horizontal X direction are compared above, the same relationship holds for angles α' and β' in the vertical direction. It is sufficient that the relationship that the maximum value of the angle α formed between the measurement light DL that the second incident-side diffraction element 59b has deflected toward the infrared light receiving device 33 and a normal line NL of the second incident-side diffraction element 59b with respect to the light guiding direction is greater than the maximum value of the angle β formed between the image light FL incident on the first incident-side diffraction element 50b and a normal line NL of the first incident-side diffraction element 50b holds in either the horizontal or vertical direction. The relationship of angles of α>β is preferably determined based on the angles of diagonals as a whole.

Corresponding to the light emitting surface 31d of the infrared light source 31a, the eye position EP shown in FIG. 2 is irradiated with the illumination light SL having an angular distribution that reflects the light emitting points 31p. On the other hand, the measurement light DL which is reflected light from the eye position EP has an angular distribution that reflects the irradiation pattern of the illumination light SL and the orientation of the eye EY, and forms a brightness pattern on the photosensitive surface 33d of the infrared sensor 33a. Light intensity pattern information measured by the photosensitive surface 33d is output to the drive control device 80 via the second drive circuit 62. The drive control device 80 stores correlation data obtained by measuring correlations between light intensity pattern information and the orientation of the eye EY in advance and thus can estimate the orientation of the eye EY, that is, the direction of the line of sight, from the measured light intensity pattern information based on the correlation data.

Figure 6:
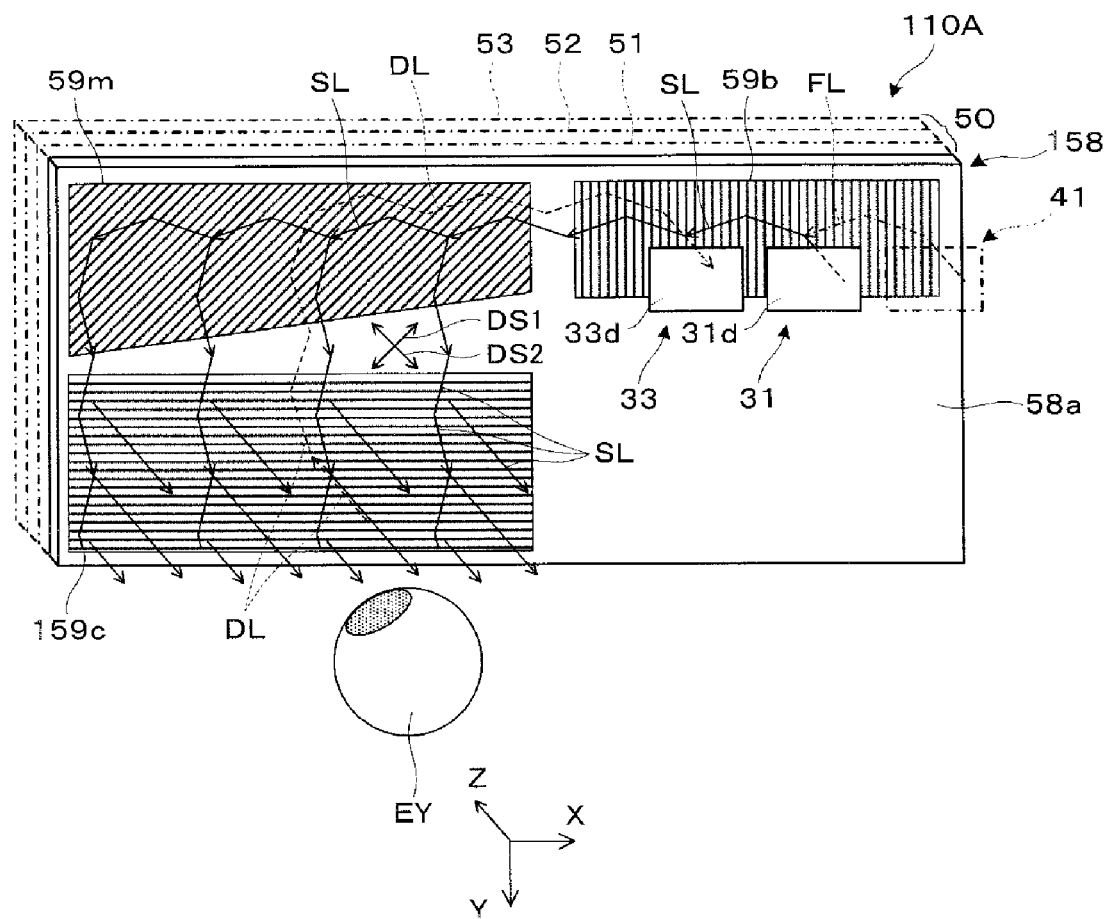
FIG. 6 is a conceptual perspective view illustrating a virtual image display device of a modification.

FIG. 6 is a conceptual perspective view illustrating a virtual image display device 110A of a modification. In this case, a second light guide optical system 158 includes a fourth light guide plate 58a, a second incident-side diffraction element 59b, a second emitting-side diffraction element 159c, and an intermediate diffraction element 59m. As described above, the second incident-side diffraction element 59b is formed with a diffraction pattern that extends linearly in the vertical Y direction and repeats periodically in the horizontal X direction. The second emitting-side diffraction element 159c is formed with a diffraction pattern that extends linearly in the horizontal X direction and repeats periodically in the vertical Y direction. The intermediate diffraction element 59m is formed with a diffraction pattern that extends linearly in an oblique direction DS1 parallel to the XY plane and repeats periodically in a direction DS2 parallel to the XY plane and perpendicular to the direction DS1. The direction DS1 is a direction rotated counterclockwise by 45° with respect to the +X direction, and is an intermediate direction between the +X direction and the +Y direction. The grating period in the direction DS2 of the pattern formed on the intermediate diffraction element 59m matches the grating period in the X direction of the pattern formed on the second incident-side diffraction element 59b and matches the grating period in the Y direction of the pattern formed on the second emitting-side diffraction element 159c.

The illumination light SL from the infrared light emitting device 31 is incident on the second incident-side diffraction element 59b at an angle corresponding to each position in the X direction on the light emitting surface 31d and injected into the fourth light guide plate 58a by diffraction and then propagates while being totally reflected in the fourth light guide plate 58a and travels in the −X direction as a whole. The illumination light SL propagating in the −X direction in the fourth light guide plate 58a is diffracted by the intermediate diffraction element 59m such that its optical path is bent in the +Y direction as a whole and shifted to a position in the −X direction that reflects the number of reflections before being diffracted by the intermediate diffraction element 59m. That is, the intermediate diffraction element 59m serves to enlarge the horizontal pupil size corresponding to a beam width in the horizontal direction or the X direction with which the illumination light SL is incident on the eye EY. The illumination light SL which propagates in the fourth light guide plate 58a in the +Y direction as a whole via the intermediate diffraction element 59m is diffracted by the second emitting-side diffraction element 159c and emitted toward the eye EY. The illumination light SL emitted from the second emitting-side diffraction element 159c reproduces the angular state when emitted from the infrared light emitting device 31 with respect to the +X direction and the +Y direction while enlarging the pupil size in the +X direction. That is, the second light guide optical system 158 enlarges the pupil size both vertically and horizontally.

Measurement light DL which is reflected light from the eye EY irradiated with the illumination light SL is introduced into the fourth light guide plate 58a by the second emitting-side diffraction element 159c, travels backward through the intermediate diffraction element 59m, is extracted out of the fourth light guide plate 58a by the second incident-side diffraction element 59b, and is incident on the infrared light receiving device 33. The infrared light receiving device 33 acquires brightness pattern information relating to the direction of the line of sight of the eye EY from an area corresponding to the pupil size enlarged by the second light guide optical system 158.

Although a detailed description has been omitted, a first diffractive light guide member 51 for blue light in a first light guide optical system 50 includes an incident-side diffraction element, an emitting-side diffraction element, and an intermediate diffraction element as elements corresponding to the second incident-side diffraction element 59b, the second emitting-side diffraction element 159c, and the intermediate diffraction element 59m of the second light guide optical system 158. Similarly, a second diffractive light guide member 52 for green light includes an incident-side diffraction element, an emitting-side diffraction element, and an intermediate diffraction element. Also, a third diffractive light guide member 53 for red light includes an incident-side diffraction element, an emitting-side diffraction element, and an intermediate diffraction element.

The virtual image display device 110 of the first embodiment described above includes the image light generating device 41 configured to emit image light FL, the infrared light emitting device 31 configured to emit infrared light, the infrared light receiving device 33 configured to receive the infrared light, the first light guide optical system 50 including the first light guide member 50a, the first incident-side diffraction element 50b provided on the incident side of the first light guide member 50a, and the first emitting-side diffraction element 50c provided on the emitting side of the first light guide member 50a, and the second light guide optical system 58 including the second light guide member 59a, the second incident-side diffraction element 59b provided on the incident side of the second light guide member 59a, and the second emitting-side diffraction element 59c provided on the emitting side of the second light guide member 59a, wherein the first incident-side diffraction element 50b deflects the image light FL emitted from the image light generating device 41 such that the image light FL is incident on the first light guide member 50a, the first emitting-side diffraction element 50c deflects the image light FL guided in the first light guide member 50a and emits the image light FL toward the eye position EP of the user, the second incident-side diffraction element 59b deflects the infrared light emitted from the infrared light emitting device 31 such that the infrared light is incident on the second light guide member 59a, the second emitting-side diffraction element 59c deflects the infrared light guided in the second light guide member 59a and emits the infrared light toward the eye position EP of the user and deflects the infrared light from the eye position EP of the user such that the infrared light is incident on the second light guide member 59a, the second incident-side diffraction element 59b emits the infrared light deflected by the second emitting-side diffraction element 59c and incident on the second light guide member 59a toward the infrared light receiving device 33, and the maximum value of an angle formed between the infrared light that the second incident-side diffraction element 59b has deflected toward the infrared light receiving device 33 and the normal line NL of the second incident-side diffraction element 59b with respect to the light guiding direction is greater than the maximum value of an angle formed between the image light FL incident on the first incident-side diffraction element 50b and the normal line NL of the first incident-side diffraction element 50b.

In the virtual image display device described above, the maximum value of the angle formed between the infrared light which the second incident-side diffraction element 59b has deflected toward the infrared light receiving device 33 and the normal line NL of the second incident-side diffraction element 59b is greater than the maximum value of the angle formed between the image light FL incident on the first incident-side diffraction element 50b and the normal line NL of the first incident-side diffraction element 50b, whereby it is possible to detect the direction of the line of sight of the user at a wider viewing angle than the viewing angle of the image light FL while limiting an increase in the size of the device.

Second Embodiment

A virtual image display device according to a second embodiment of the present disclosure will be described below. The virtual image display device of the second embodiment is a partial modification of the virtual image display device of the first embodiment and description of common parts will be omitted.

Figure 7:
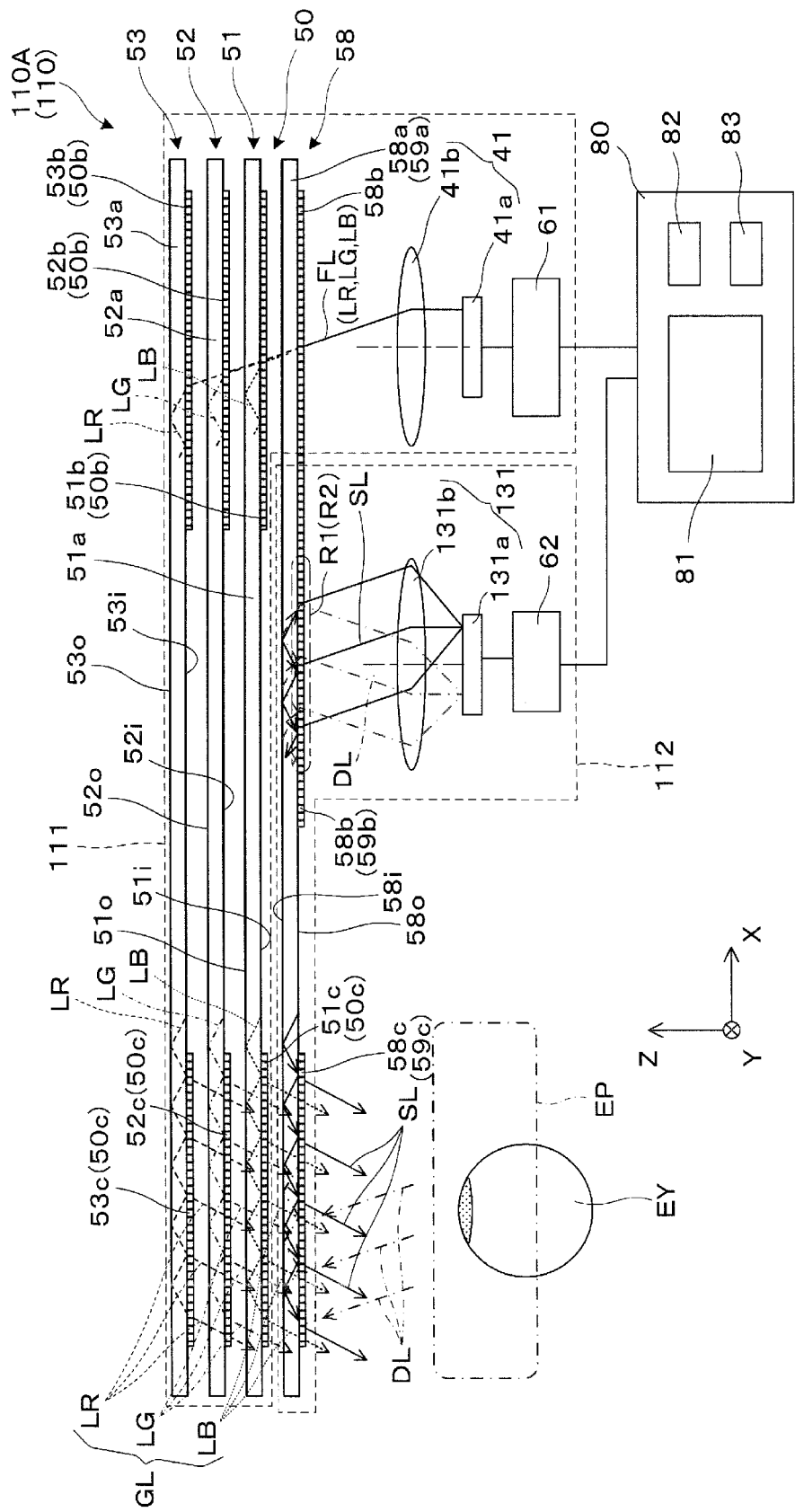
FIG. 7 is a plan view of a virtual image display device according to a second embodiment.

The virtual image display device 110 of the second embodiment shown in FIG. 7 is a first virtual image display device 110A for the right eye and a second virtual image display device 110B for the left eye (see FIG. 1) is omitted from the illustration.

An infrared light composite device 131 in a line-of-sight detection device 112 of the first virtual image display device 110A serves as both the infrared light emitting device 31 and the infrared light receiving device 33 shown in FIG. 2. The infrared light composite device 131 includes a composite unit 131a and a collimator lens 131b. The composite unit 131a serves as both the infrared light source 31a and the infrared sensor 33a shown in FIG. 2. The first light guide optical system 50 and the second light guide optical system 58 are not changed and description thereof is omitted.

Figure 8:
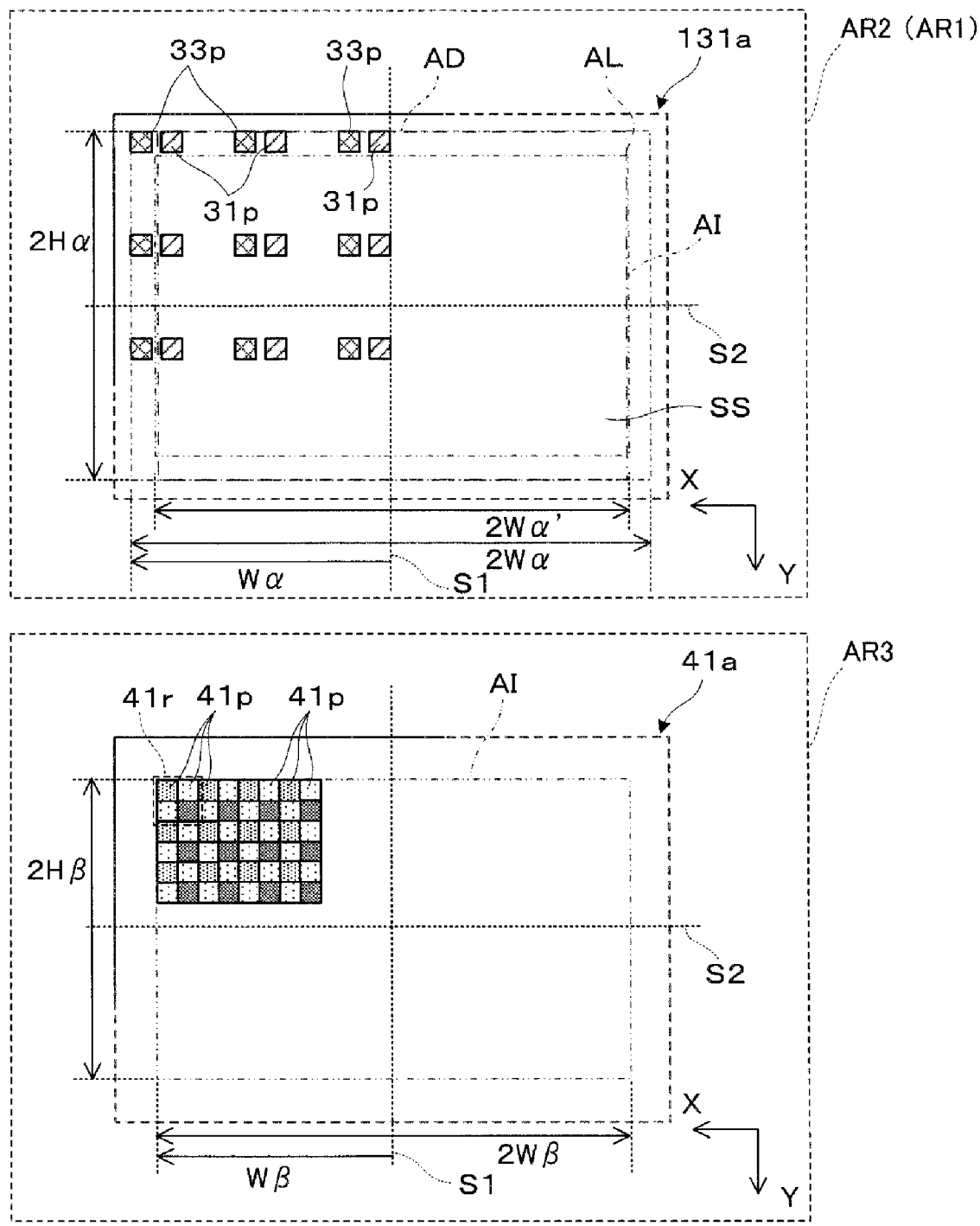
FIG. 8 is a diagram illustrating states of an infrared light source, an infrared sensor, and a display panel according to the second embodiment.

As shown in FIG. 8, light emitting points 31p which are light emitting elements and detection points 33p which are light receiving elements are arranged in the composite unit 131a in the same surface SS. Specifically, the light emitting points 31p and the detecting points 33p are formed on the same device and coexist in substantially the same region.

A horizontal width $2W\alpha$ and a vertical width $2H\alpha$ of an effective area AD which is a light receiving area of the infrared light composite device 131 shown in FIG. 7 are one size larger than a horizontal width $2W\beta$ and a vertical width $2H\beta$ of an effective area AI which is a display area of an image light generating device 41. In the shown example, a horizontal width $2W\alpha'$ of an effective area AL which is a light emitting area of the infrared light composite device 131 is substantially the same as a horizontal width $2W\beta$ of the effective area AI which is the display area of the image light generating device 41 and a vertical width $2H\alpha$ of the effective area AL is larger than the vertical width $2H\beta$ of the effective area AI. Here, the effective area AL may be larger than the effective area AI in the X direction.

The maximum value of an angle $\alpha$ formed between measurement light DL that the second incident-side diffraction element 59b has deflected toward the infrared light composite device 131 and a normal line of the second incident-side diffraction element 59b is greater than the maximum value of an angle $\beta$ formed between image light FL incident on the first incident-side diffraction element 50b and a normal line of the first incident-side diffraction element 50b. In the infrared light composite device 131, a length $W\alpha$ from a reference line S1 of the effective area AD to the periphery of the effective area AD corresponds to the maximum value of the angle $\alpha$ formed between the measurement light DL and the normal line of the second incident-side diffraction element 59b as shown in FIG. 8. In the image light generating device 41, a length $W\beta$ from the reference line S1 of the effective area AI to the periphery of the effective area AI corresponds to the maximum value of the angle $\beta$ formed between the image light FL and the normal line of the first incident-side diffraction element 50b. The angles $\alpha$ and $\beta$ have a relationship of $\alpha>\beta$.

Although light emitting points 31p and detection points 33p are arranged in the composite unit 131a of the infrared light composite device 131 in a one-to-one correspondence in the example of FIG. 8, they may be in an arrangement biased in terms of the number of arranged or corresponding points.

In the virtual image display device 110 of the second embodiment described above, light emitting points 31p and detection points 33p are arranged in the composite unit 131a in the same surface SS, whereby the infrared light composite device 131 which is an active device of the virtual image display device 110 can be made compact and the horizontal width size, that is, the size in the X direction, of the device can be reduced.

Third Embodiment

A virtual image display device according to a third embodiment will be described below. The virtual image display device of the third embodiment is a partial modification of the virtual image display device of the first embodiment.

Figure 9:
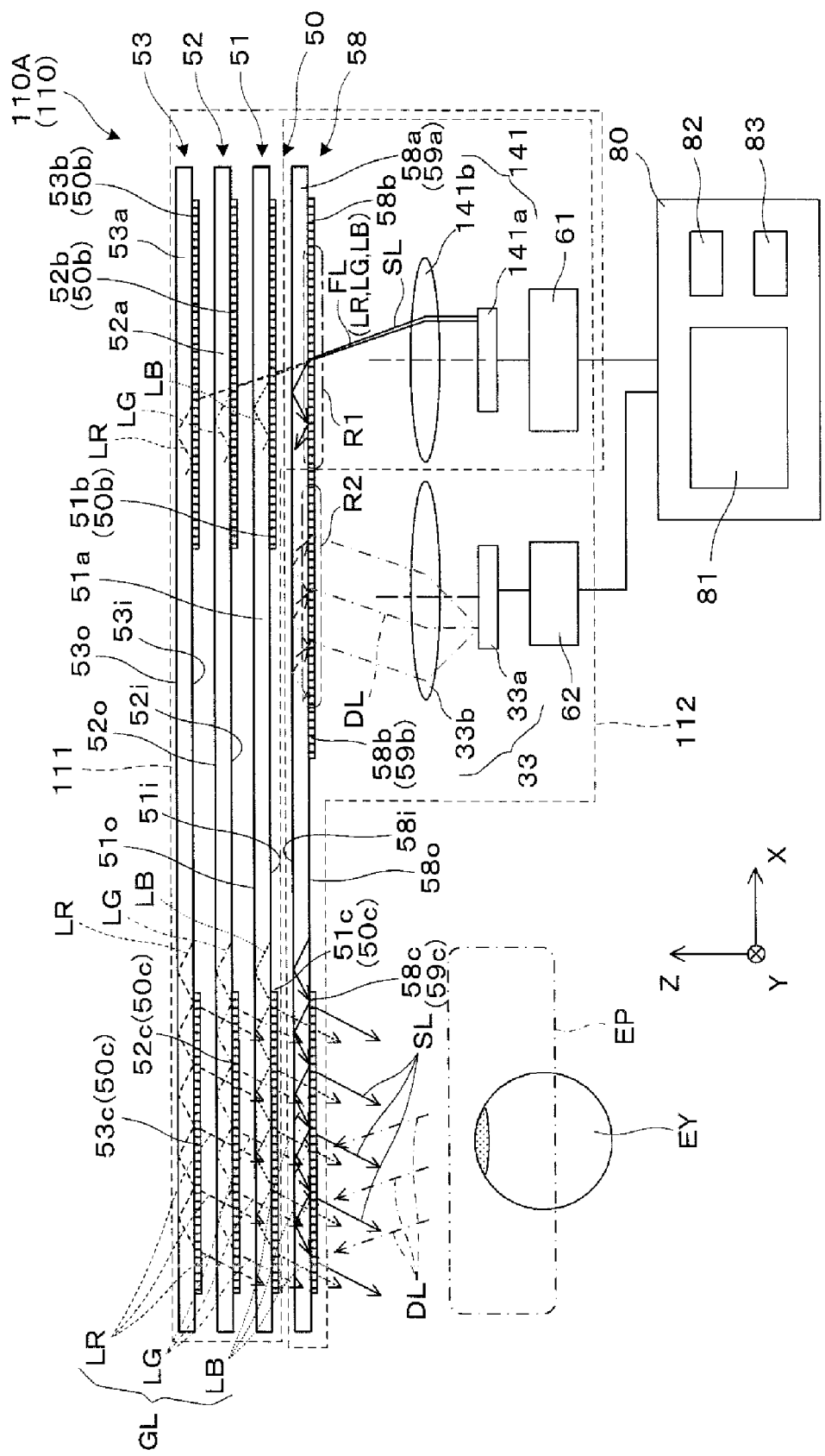
FIG. 9 is a plan view of a virtual image display device according to a third embodiment.

A light source composite device 141 in a projection device 111 of the first virtual image display device 110A shown in FIG. 9 serves as both the image light generating device 41 and the infrared light emitting device 31 shown in FIG. 2. The light source composite device 141 includes a composite unit 141a and a collimator lens 141b. The composite unit 141a serves as both the display panel 41a and the infrared light source 31a shown in FIG. 2. The first light guide optical system 50 and the second light guide optical system 58 are not changed and description thereof is omitted.

In control of the operations of the display panel and the infrared light source of the composite unit 141a, a first drive circuit 61 synchronizes the display operation of the display panel and the lighting operation of the infrared light source to adjust the light emission timings.

Although the infrared light source in the composite unit 141a is configured to be operated by the first drive circuit 61 in the example of FIG. 9, it may also be configured to be operated by the second drive circuit 62 as in the first embodiment.

Figure 10:
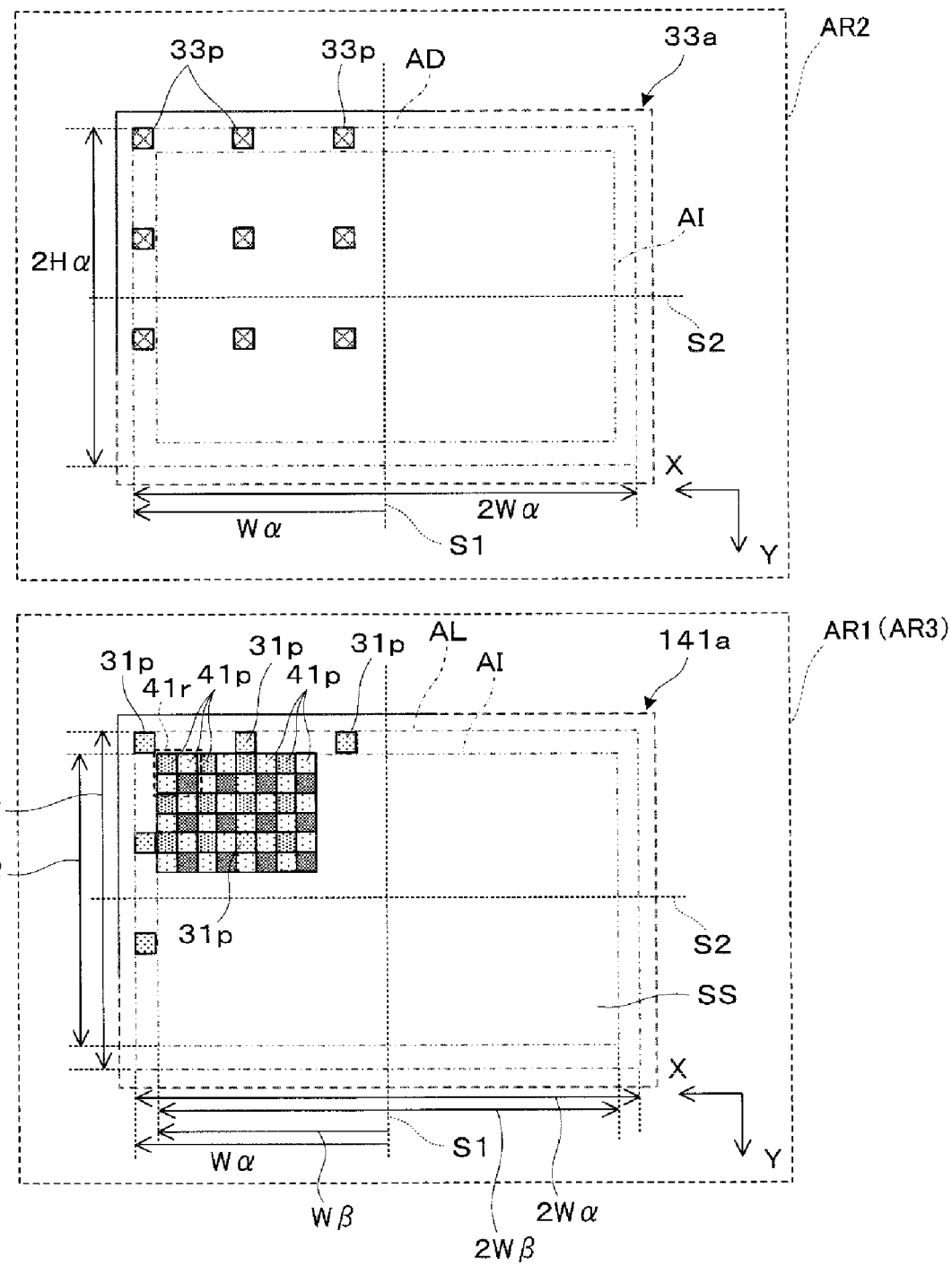
FIG. 10 is a diagram illustrating states of an infrared light source, an infrared sensor, and a display panel according to the third embodiment.

As shown in FIG. 10, light emitting points 31p which are light emitting elements and pixels 41r are arranged in the composite unit 141a in the same surface SS. Because the number of light emitting points 31p does not need to be as large as that of pixels 41r, light emitting points 31p are arranged in the effective area AI at positions where pixel points 41p of the pixels 41r in the effective area AI are thinned out. In the shown example, it is possible to adopt a configuration in which one pixel point 41p for green in each pixel 41r composed of one pixel point 41p for red, one pixel point 41p for blue, and two pixel points 41p for green is replaced with a light emitting point 31p. The arrangement of light emitting points 31p and pixels 41r or pixel points 41p is not limited to the shown arrangement and may be that in which light emitting points 31p are arranged only on the perimeter of the effective area AI.

A horizontal width 2Wα and a vertical width 2Hα of an effective area AD which is a light receiving area of an infrared light receiving device 33 shown in FIG. 9 are one size larger than a horizontal width 2Wβ and a vertical width 2Hβ of the effective area AI which is a display area of the light source composite device 141. In the shown example, a horizontal width 2Wα and a vertical width 2Hα of an effective area AL which is a light emitting area of the light source composite device 141 are one size larger than the horizontal width 2Wβ and the vertical width 2Hβ of the effective area AI which is the display area of the light source composite device 141.

The maximum value of an angle α formed between measurement light DL that the second incident-side diffraction element 59b has deflected toward the infrared light receiving device 33 and a normal line of the second incident-side diffraction element 59b is greater than the maximum value of an angle β formed between image light FL incident on the first incident-side diffraction element 50b and a normal line of the first incident-side diffraction element 50b. In the infrared light receiving device 33, a length Wα from a reference line S1 of the effective area AD to the periphery of the effective area AD corresponds to the maximum value of the angle α formed between the measurement light DL and the normal line of the second incident-side diffraction element 59b as shown in FIG. 10. In the light source composite device 141, a length Wβ from the reference line S1 of the effective area AI to the periphery of the effective area AI corresponds to the maximum value of the angle β formed between the image light FL and the normal line of the first incident-side diffraction element 50b. The angles α and β have a relationship of α>β.

In the virtual image display device 110 of the third embodiment described above, light emitting points 31p and pixels 41r are arranged in the composite unit 141a in the same surface SS, whereby the light source composite device 141 which is an active device of the virtual image display device 110 can be made compact and the horizontal width size, that is, the size in the X direction, of the device can be reduced.

Fourth Embodiment

A virtual image display device according to a fourth embodiment will be described below. The virtual image display device of the fourth embodiment is a partial modification of the virtual image display device of the first embodiment.

Figure 11:
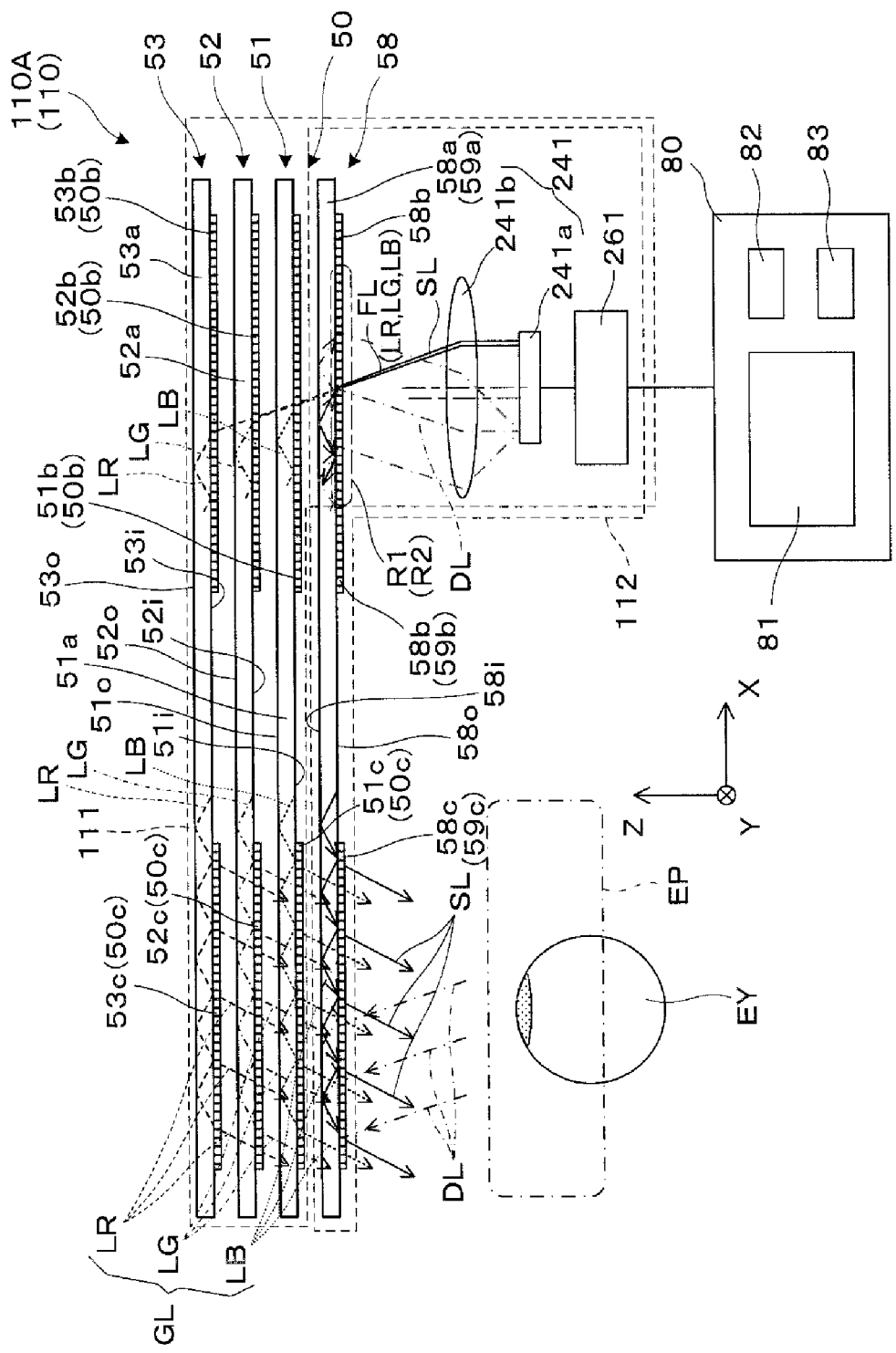
FIG. 11 is a plan view of a virtual image display device according to a fourth embodiment.

A composite device 241 in a projection device 111 or a line-of-sight detection device 112 of the first virtual image display device 110A shown in FIG. 11 serves as all of the image light generating device 41, the infrared light emitting device 31, and the infrared light receiving device 33 shown in FIG. 2. The composite device 241 includes a composite unit 241a and a collimator lens 241b. The composite unit 241a serves as all of the display panel 41a, the infrared light source 31a, and the infrared sensor 33a shown in FIG. 2. The first light guide optical system 50 and the second light guide optical system 58 are not changed and description thereof is omitted.

In the example of FIG. 11, a first drive circuit 261 operates the display panel, the infrared light source, and the infrared sensor of the composite unit 241a.

Figure 12:
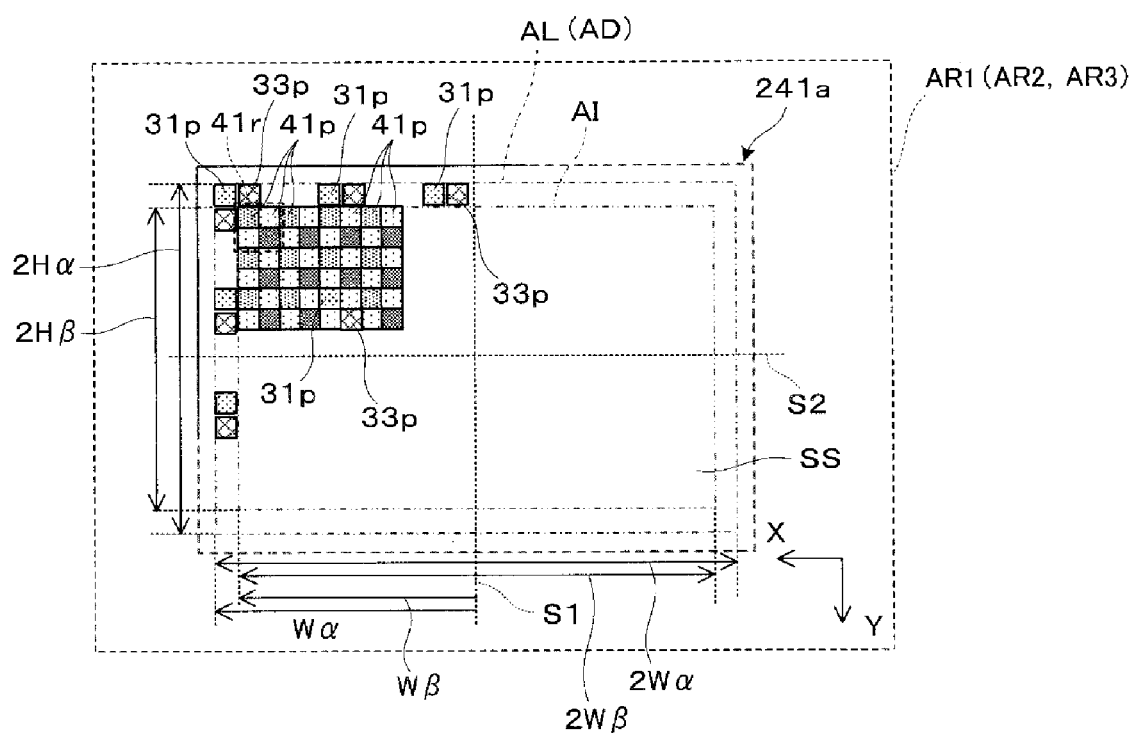
FIG. 12 is a diagram illustrating states of an infrared light source, an infrared sensor, and a display panel according to the fourth embodiment.

As shown in FIG. 12, light emitting points 31p which are light emitting elements, detection points 33p which are light receiving elements, and pixels 41r are arranged in the composite unit 241a in the same surface SS. Because the number of light emitting points 31p does not need to be as large as that of pixels 41r, light emitting points 31p are arranged in the effective area AI at positions where pixel points 41p of the pixels 41r in the effective area AI are thinned out. Detection points 33p are also arranged in the effective area AI at positions where pixel points 41p in the effective area AI are thinned out. In the shown example, it is possible to adopt a configuration in which one pixel point 41p for green in each pixel 41r composed of one pixel point 41p for red, one pixel point 41p for blue, and two pixel points 41p for green is replaced with a light emitting point 31p and one pixel point 41p for green in a pixel 41r adjacent to the replaced pixel 41r is replaced with a detection point 33p. The arrangement of light emitting points 31p, detection points 33p, and pixels 41r or pixel points 41p is not limited to the shown arrangement and may be that in which light emitting points 31p and detection points 33p are arranged only on the perimeter of the effective area AI.

A horizontal width 2Wα and a vertical width 2Hα of an effective area AD which is a light receiving area of the composite device 241 shown in FIG. 11 are one size larger than a horizontal width 2Wβ and a vertical width 2Hβ of the effective area AI which is a display area of the composite device 241. In the shown example, a horizontal width 2Wα and a vertical width 2Hα of an effective area AL which is a light emitting area of the composite device 241 are one size larger than the horizontal width 2Wβ and the vertical width 2Hβ of the effective area AI which is the display area of the composite device 241.

The maximum value of an angle α formed between measurement light DL that the second incident-side diffraction element 59b has deflected toward the composite device 241 and a normal line of the second incident-side diffraction element 59b is greater than the maximum value of an angle β formed between image light FL incident on the first incident-side diffraction element 50b and a normal line of the first incident-side diffraction element 50b. In the composite device 241, a length Wα from a reference line S1 of the effective area AD to the periphery of the effective area AD corresponds to the maximum value of the angle α formed between the measurement light DL and the normal line of the second incident-side diffraction element 59b as shown in FIG. 12. In the composite device 241, a length Wβ from the reference line S1 of the effective area AI to the periphery of the effective area AI corresponds to the maximum value of the angle β formed between the image light FL and the normal line of the first incident-side diffraction element 50b. The angles α and β have a relationship of α>β.

In the virtual image display device 110 of the fourth embodiment described above, light emitting points 31p, detection points 33p, and pixels 41r are arranged in the composite unit 241a in the same surface SS, whereby the composite device 241 which is an active device of the virtual image display device 110 can be made compact and the horizontal width size, that is, the size in the X direction, of the device can be further reduced compared to the second and third embodiments.

Fifth Embodiment

A virtual image display device according to a fifth embodiment of the present disclosure will be described below. The virtual image display device of the fifth embodiment is a partial modification of the virtual image display device of the first embodiment and description of common parts will be omitted.

Figure 13:
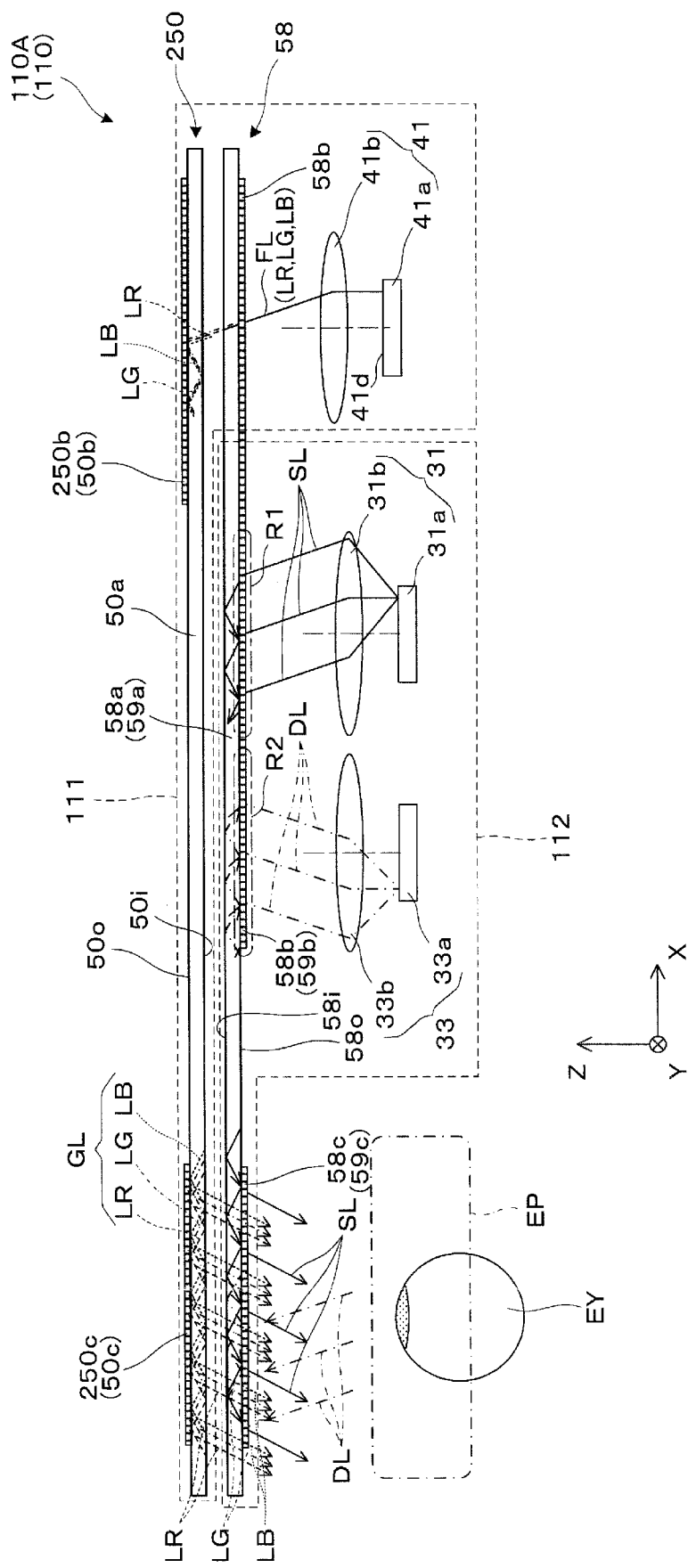
FIG. 13 is a plan view of a virtual image display device according to a fifth embodiment.

In a first virtual image display device 110A shown in FIG. 13, a first light guide optical system 250 that emits image light FL as display light GL is obtained by integrating the diffractive light guide members 51, 52, and 53 shown in FIG. 2 and alone enables three-color display. The second light guide optical system 58 is not changed and description thereof is omitted.

The first light guide optical system 250 includes a first light guide member 50a, an incident diffraction layer 250b, and an emitting diffraction layer 250c. Among these, the incident diffraction layer 250b functions as a first incident-side diffraction element 50b and deflects the image light FL emitted from the image light generating device 41 such that the image light FL enters the first light guide member 50a in a state in which it is guidable therein. The emitting diffraction layer 250c functions as a first emitting-side diffraction element 50c and emits the image light FL guided in the first light guide member 50a toward the outside where the eye EY is present. The first light guide member 50a is similar to the light guide plates 51a, 52a, and 53a of the diffractive light guide members 51, 52, and 53 and enables light guiding by total internal reflection by a pair of flat surfaces 50i and 50o. The image light generating device 41 is similar to that shown in FIG. 2 and the image light FL emitted from the image light generating device 41 includes image light LB, LG, and LR of three colors.

The incident diffraction layer 250b or the first incident-side diffraction element 50b injects the image light LB, LG, and LR of three colors incident on it into the first light guide member 50a by diffraction such that it propagates in the first light guide member 50a. Specifically, the incident diffraction layer 250b or the first incident-side diffraction element 50b is, for example, a diffraction element formed of a reflective volume hologram. A three-dimensional pattern recorded on the diffraction element with the reflection volume hologram is set to make the diffraction angles of the image light LB, LG, and LR of three colors, that is, the angles of reflection or the angles of incidence thereof in the first light guide member 50a, greater than a critical angle determined by the refractive index of the first light guide member 50a such that the image light LB, LG, and LR of three colors propagate in the first light guide member 50a by total internal reflection.

The emitting diffraction layer 250c or the first emitting-side diffraction element 50c extracts the image light LB, LG, and LR of three colors traveling in the −X direction as a whole in the first light guide member 50a out of the first light guide member 50a by diffraction and emits the image light LB, LG, and LR of three colors toward the eye position EP where the eye EY of the wearer US is disposed. Specifically, the emitting diffraction layer 250c or the first emitting-side diffraction element 50c is, for example, a diffraction element formed of a reflective volume hologram. The three-dimensional pattern recorded on the diffraction element with the reflection volume hologram is set to, when the image light LB, LG, and LR of three colors propagate while being totally reflected, transmit the image light LB, LG, and LR of three colors by diffraction at a certain location while restoring angle information before being incident on the incident diffraction layer 250b or the first incident-side diffraction element 50b.

Guidance of the image light FL and formation of a virtual image using the first light guide member 50a will be described below. The blue image light LB from a display surface 41d is incident on the incident diffraction layer 250b at an angle corresponding to each position in the X direction on the display surface 41d in a plan view as viewed in the +Y direction by passing through the collimator lens 41b and is diffracted in a direction at an angle corresponding to the three-dimensional pattern of the reflective volume hologram type diffraction element formed in the incident diffraction layer 250b and then propagates while being totally reflected in the first light guide member 50a and travels in the −X direction as a whole. The other green and red image light LG and LR are also incident on and diffracted by the incident diffraction layer 250b and then propagate while being totally reflected in the first light guide member 50a and travel in the −X direction as a whole. The blue image light LB propagating in the −X direction as a whole in the first light guide member 50a is diffracted by the emitting diffraction layer 250c and emitted from a position on the emitting diffraction layer 250c toward the eye EY. The other green and red image light LG and LR are also incident on and diffracted by the emitting diffraction layer 250c and emitted from a position on the emitting diffraction layer 250c toward the eye EY. In the above, the image light LB, LG, and LR emitted from the first light guide member 50a, that is, the display light GL, has an enlarged pupil size in the +X direction.

Figure 14:
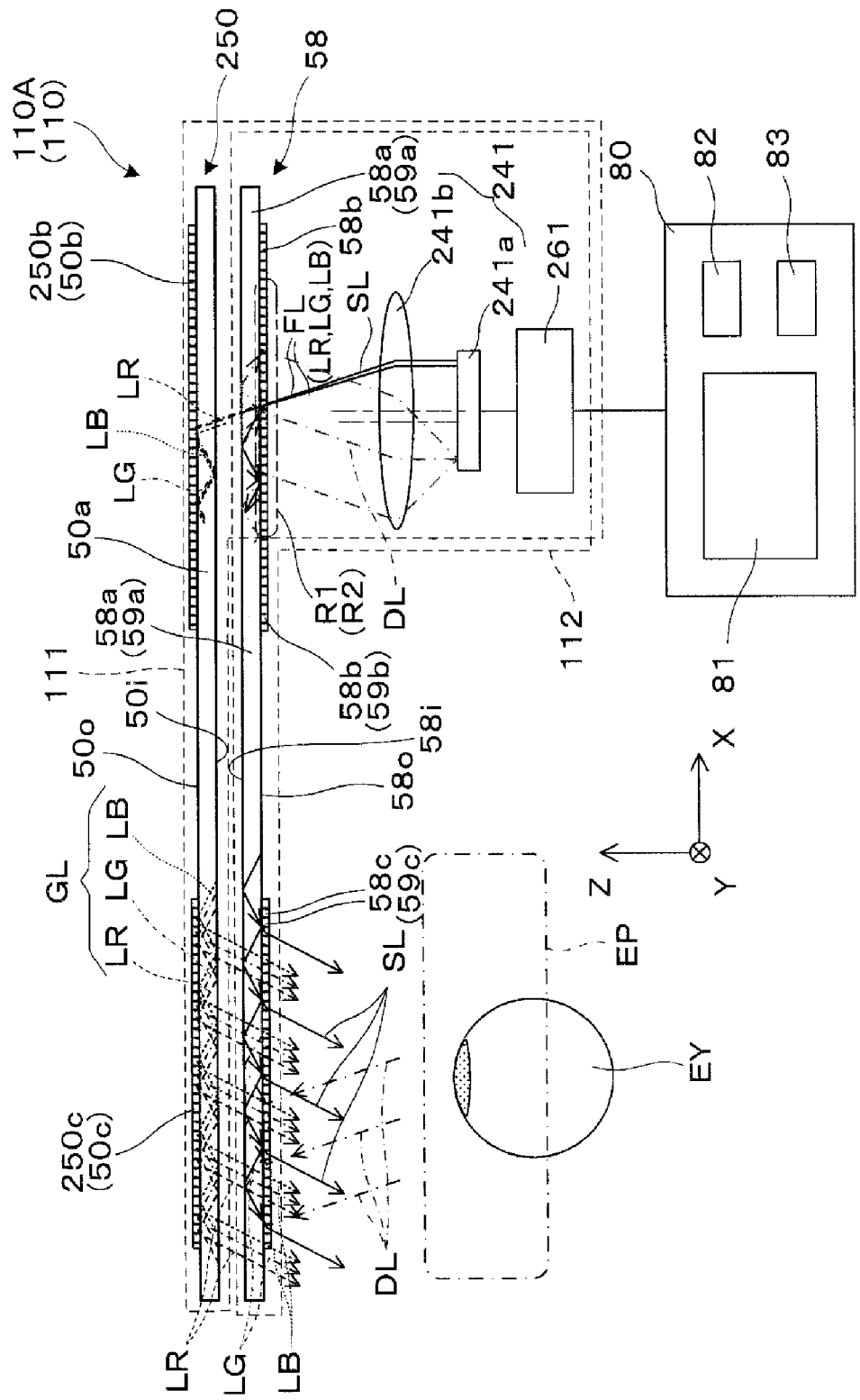
FIG. 14 is a diagram illustrating a modification of the virtual image display device shown in FIG. 13.

In the fifth embodiment, a projection device 111 and a line-of-sight detection device 112 may adopt the configurations of the second to fourth embodiments. The same applies to the following embodiments. For example, the virtual image display device 110A can include the composite device 241 shown in FIG. 11 as shown in FIG. 14.

In the virtual image display device 110 of the fifth embodiment described above, the first light guide optical system 250 is obtained by integrating the first light guide members for the colors, thus facilitating a reduction in the weight and thickness of the virtual image display device 110.

Sixth Embodiment

A virtual image display device according to a sixth embodiment will be described below. The virtual image display device of the sixth embodiment is a partial modification of the virtual image display device of the first embodiment.

Figure 15:
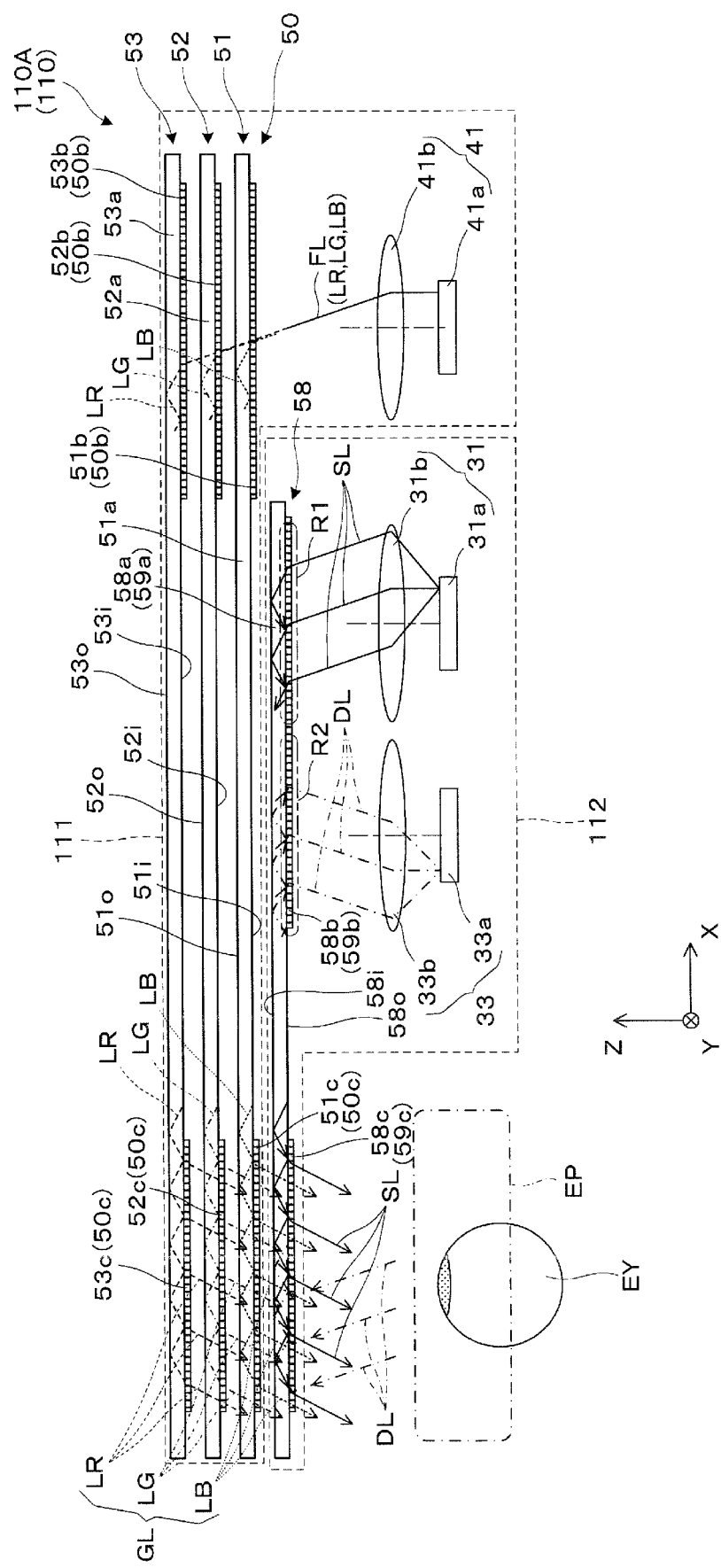
FIG. 15 is a plan view of a virtual image display device according to a sixth embodiment.

As shown in FIG. 15, in a first virtual image display device 110A, a second light guide optical system 58 extends substantially parallel to the XY plane, while the width of a fourth light guide plate 58a in a horizontal extension direction in which the second light guide optical system 58 extends, that is, in the X direction, that is, the width of the second light guide member 59a in the horizontal extension direction, is narrower than the widths of the light guide plates 51a, 52a, and 53a in the extension direction of the first light guide optical system 50 or the diffractive light guide members 51, 52, and 53, that is, in the X direction. A second incident-side diffraction element 59b is disposed closer to a second emitting-side diffraction element 59c than the first incident-side diffraction elements 50b are in the X direction which is the extension direction of the second light guide member 59a and the second incident-side diffraction element 59b and the first incident-side diffraction elements 50b are arranged such that they do not overlap in the −Z direction corresponding to the emission direction of the image light FL. In this case, the horizontal width of the second light guide optical system 58 is narrower than the horizontal width of the first light guide optical system 50 and the second light guide optical system 58 is shorter than the first light guide optical system 50 in the X direction which is the extension direction of the second light guide member 59a and thus the size of the second light guide optical system 58 can be reduced by the reduction in the horizontal width of the second light guide optical system 58. Because the image light FL emitted from the image light generating device 41 is incident on the first light guide optical system 50, that is, the diffractive light guide members 51, 52, and 53, without passing through the second light guide optical system 58, loss of light intensity due to the second light guide optical system 58 can be avoided.

The following is an example of a modification of the virtual image display device 110A shown in FIG. 15. The virtual image display device 110A may be configured such that, for example, the width of the fourth light guide plate 58a in the horizontal extension direction in which the second light guide optical system 58 extends, that is, in the X direction, that is, the width of the second light guide member 59a in the horizontal extension direction, is equal to the width of the light guide plates 51a, 52a, and 53a in the extension direction of the first light guide optical system 50, that is, in the X direction, but the first infrared diffraction layer 58b is formed in regions R1 and R2 facing the infrared light emitting device 31 or the infrared light receiving device 33 and not formed in a region facing the image light generating device 41. In this case, although the size of the second light guide optical system 58 cannot be reduced, the amount of light lost by the second light guide optical system 58 can be reduced.

Seventh Embodiment

A virtual image display device according to a seventh embodiment will be described below. The virtual image display device of the seventh embodiment is a partial modification of the virtual image display device of the first embodiment.

Figure 16:
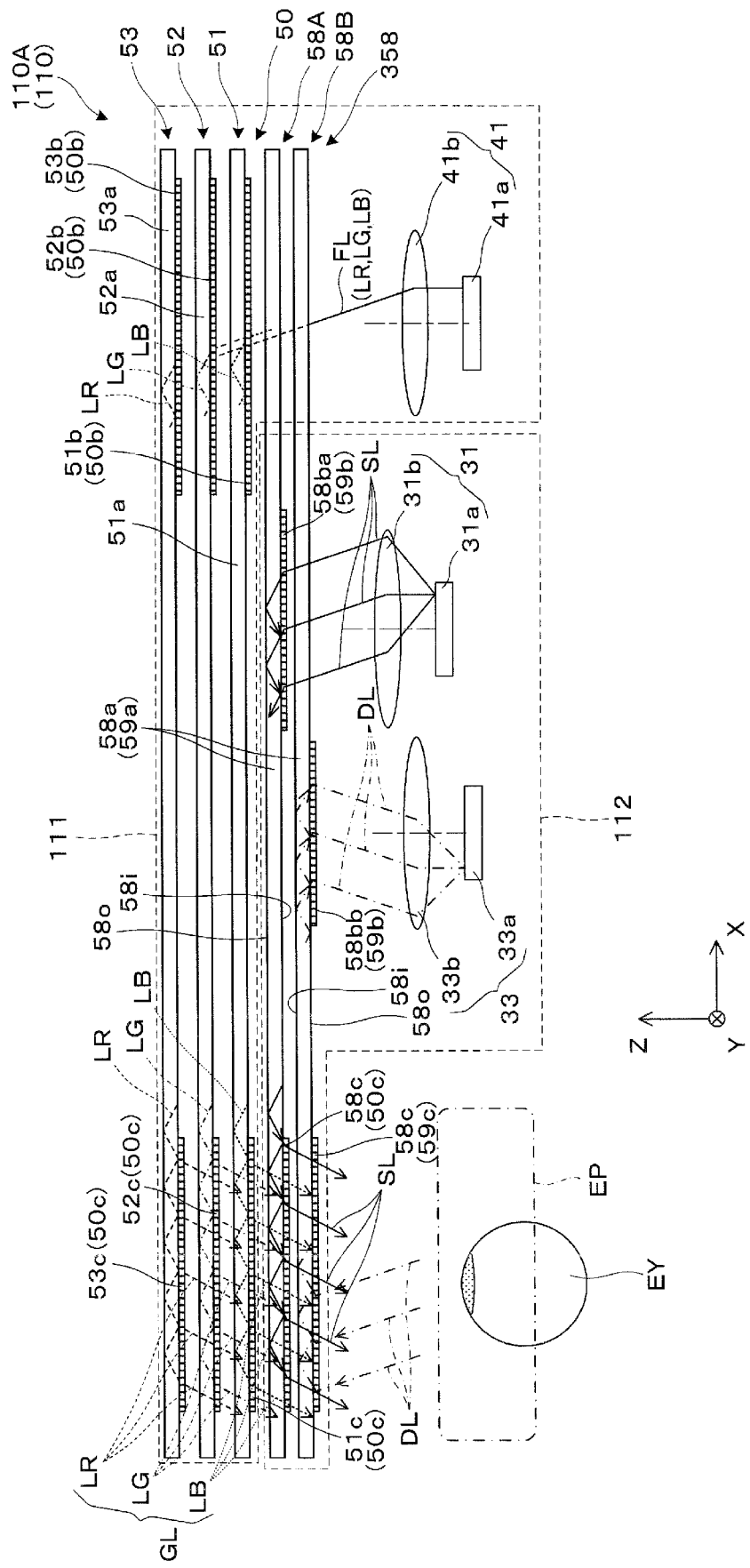
FIG. 16 is a plan view of a virtual image display device according to a seventh embodiment.

As shown in FIG. 16, in a first virtual image display device 110A, a second light guide optical system 358 includes an illumination light guide optical system 58A and a light-receiving light guide optical system 58B. The illumination light guide optical system 58A includes a fourth light guide plate 58a, a first infrared diffraction layer 58ba, and a second infrared diffraction layer 58c. Here, the fourth light guide plate 58a is a first infrared light guide member. The first infrared diffraction layer 58ba is a first infrared incident-side diffraction element and functions as a part of the second incident-side diffraction element 59b. The light-receiving light guide optical system 58B includes a fourth light guide plate 58a, a first infrared diffraction layer 58bb, and a second infrared diffraction layer 58c. Here, the fourth light guide plate 58a is a second infrared light guide member. The first infrared diffraction layer 58bb is a second infrared incident-side diffraction element and functions as a part of the second incident-side diffraction element 59b. The first infrared diffraction layer 58ba deflects illumination light SL which is infrared light emitted from the infrared light emitting device 31 such that the illumination light SL enters the fourth light guide plate 58a in a state in which it is guidable therein. The first infrared diffraction layer 58bb emits measurement light DL, which is infrared light traveling backward from the second infrared diffraction layer 58c, toward the infrared light receiving device 33.

In this case, the optical path of the illumination light SL and the optical path of the measurement light DL can be separated, which can prevent the illumination light SL introduced into the fourth light guide plate 58a by the first infrared diffraction layer 58ba from being incident on the first infrared diffraction layer 58bb before reaching the second infrared diffraction layer 58c and thus being directly incident on the infrared light receiving device 33. That is, it is possible to prevent the illumination light SL superimposed on the measurement light DL from being incident on the infrared light receiving device 33, thus increasing the accuracy of detection of the direction of the line of sight by the line-of-sight detection device 112.

Eighth Embodiment

A virtual image display device according to an eighth embodiment will be described below. The virtual image display device of the eighth embodiment is a partial modification of the virtual image display device of the first embodiment.

Figure 17:
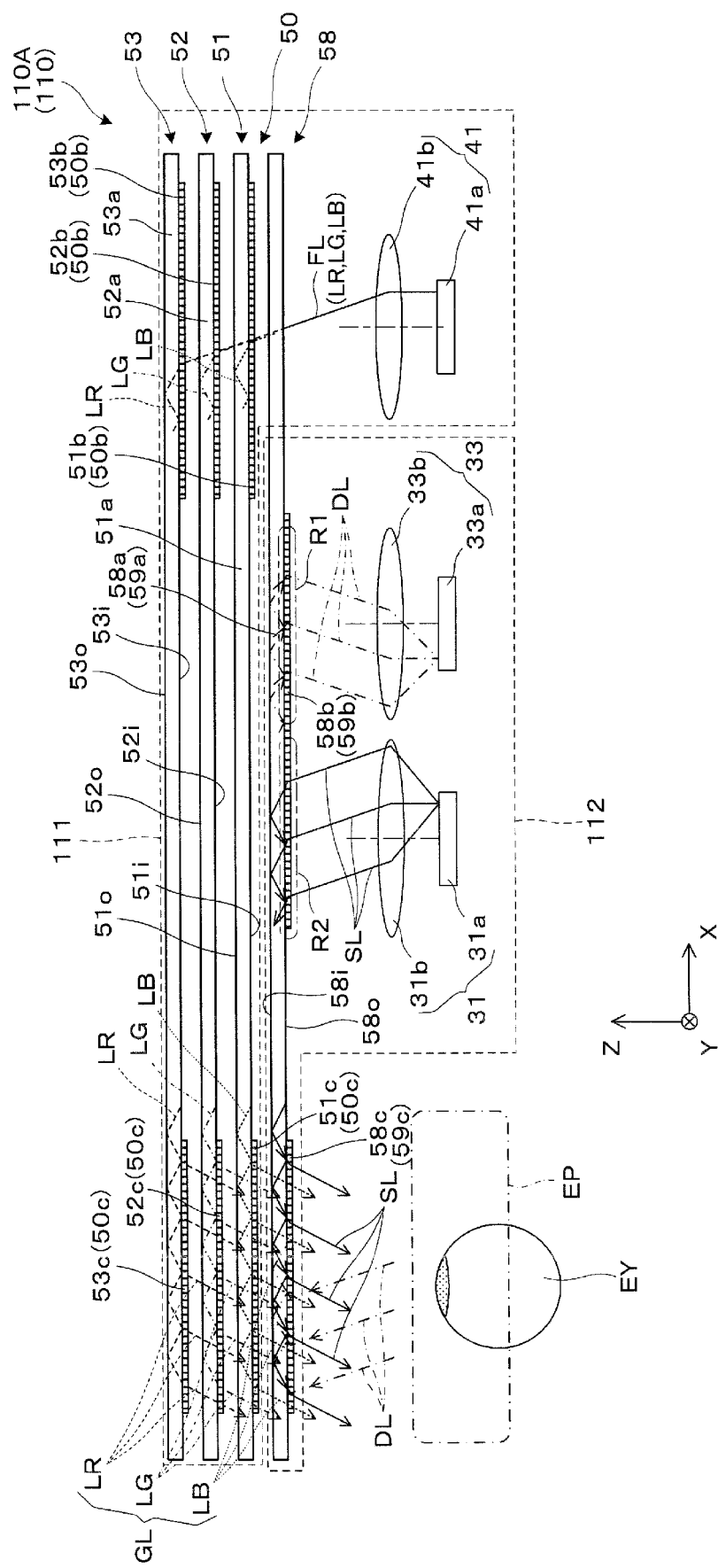
FIG. 17 is a plan view of a virtual image display device according to an eighth embodiment.

In a second light guide optical system 58 shown in FIG. 17, an infrared light emitting device 31 is disposed closer to a second emitting-side diffraction element 59c than an infrared light receiving device 33 is in the extension direction of a fourth light guide plate 58a which is a second light guide member 59a. That is, the infrared light receiving device 33 is disposed closer to an image light generating device 41 than the infrared light emitting device 31 is in the extension direction of the fourth light guide plate 58a. In this case, illumination light SL emitted from the infrared light emitting device 31 can be incident on the second light guide member 59a by a second region R2 on the −X side of the first infrared diffraction layer 58b and measurement light DL traveling backward from the second infrared diffraction layer 58c can be emitted toward the infrared light receiving device 33 by a first region R1 on the +X side of the first infrared diffraction layer 58b.

In this case, the illumination light SL from the infrared light emitting device 31 is less likely to be incident on the infrared light receiving device 33, thus increasing the accuracy of detection of the direction of the line of sight by the line-of-sight detection device 112.

Ninth Embodiment

A virtual image display device according to a ninth embodiment will be described below. The virtual image display device of the ninth embodiment is a partial modification of the virtual image display device of the first embodiment.

Figure 18:
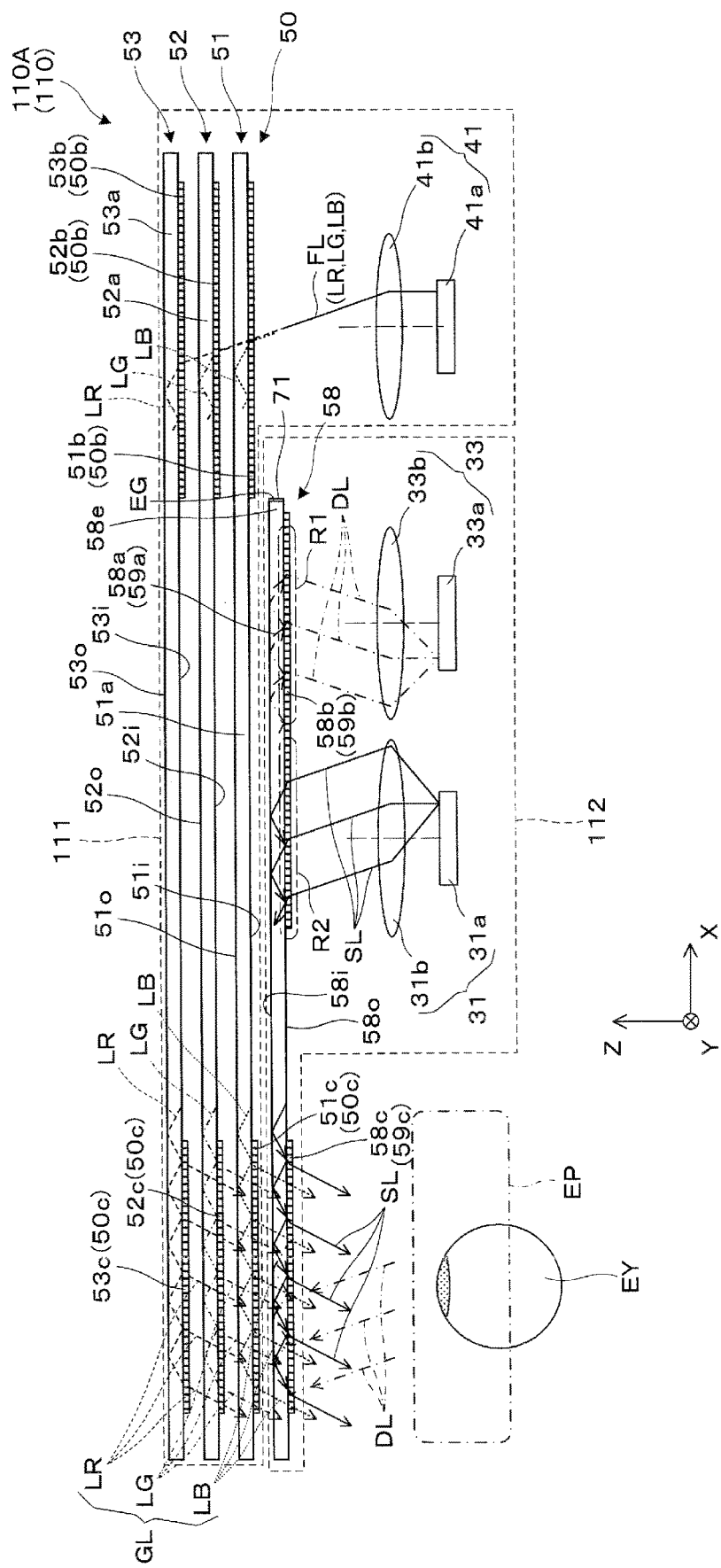
FIG. 18 is a plan view of a virtual image display device according to a ninth embodiment.

In a first virtual image display device 110A shown in FIG. 18, a light blocking film 71 is disposed on an end surface EG of a fourth light guide plate 58a of a second light guide optical system 58 at an end portion 58e thereof on the +X side, that is, on the side farther from a second emitting-side diffraction element 59c. The light blocking film 71 is attached to the end surface EG of the fourth light guide plate 58a. The light blocking film 71 attenuates visible light and prevents image light FL emitted from an image light generating device 41 from being coupled to the fourth light guide plate 58a and becoming stray light. The light blocking film 71 may be a reflective film that attenuates visible light by reflection. The light blocking film 71 may attenuate not only visible light but also infrared light. In this case, it is possible to prevent external infrared light from being coupled to the fourth light guide plate 58a and becoming stray light.

The light blocking film 71 may also be provided on an end portion of the fourth light guide plate 58a on the −X side, that is, on the side closer to the second emitting-side diffraction element 59c.

Tenth Embodiment

A virtual image display device according to a tenth embodiment will be described below. The virtual image display device of the tenth embodiment is a partial modification of the virtual image display device of the first embodiment.

Figure 19:
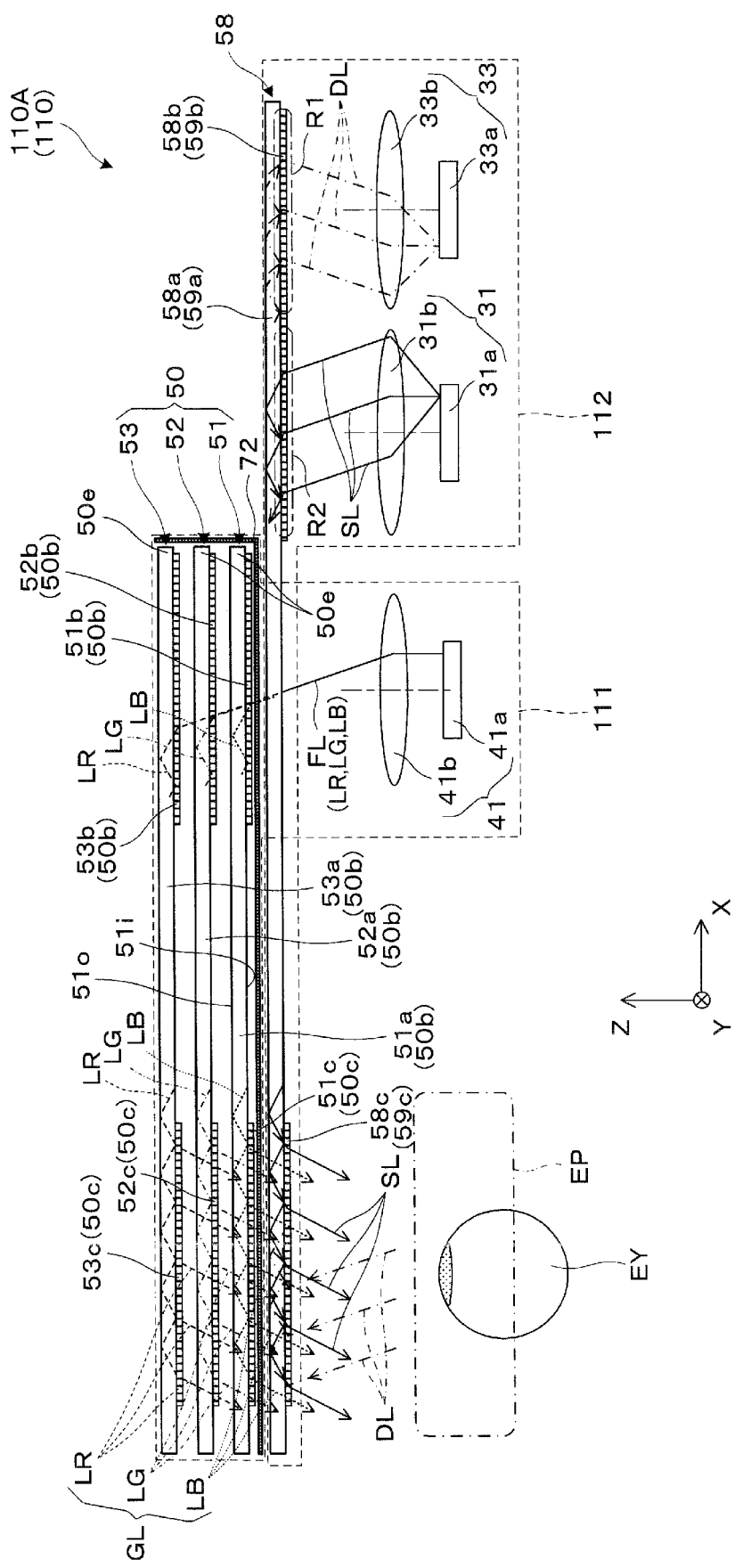
FIG. 19 is a plan view of a virtual image display device according to a tenth embodiment.

In a first virtual image display device 110A shown in FIG. 19, the widths of light guide plates 51a, 52a, and 53a in the extension direction of a first light guide optical system 50 or diffractive light guide members 51, 52, and 53, that is, in the X direction, are narrower than the width of a fourth light guide plate 58a in a horizontal extension direction in which a second light guide optical system 58 extends, that is, in the X direction. Correspondingly, first incident-side diffraction elements 50b are disposed closer to a second emitting-side diffraction element 59c than a second incident-side diffraction element 59b is in the X direction which is the extension direction of the fourth light guide plate 58a. As a result, an image light generating device 41 is disposed closer to the second emitting-side diffraction element 59c than an infrared light emitting device 31 and an infrared light receiving device 33 are in the X direction which is the extension direction of the first light guide optical system 50.

Further, a wavelength selection member 72 is disposed to cover the +X side and the −Z side of the first light guide optical system 50. The wavelength selection member 72 is a sheet-like or plate-like member and is supported by the support device 120 shown in FIG. 1 and disposed facing end portions 50e of the first light guide members 50a on the incident side and a flat surface 51i thereof closest to the second light guide member 59a. Here, the wavelength selection member 72 is disposed apart from the second light guide member 59a and the like. The wavelength selection member 72 blocks the illumination light SL and the measurement light DL which are infrared light and transmits the image light FL. In this case, it is possible to prevent infrared light from leaking from the second light guide member 59a to the first light guide members 50a and the outside thereof and prevent incident light or return light from the first light guide members 50a from affecting infrared light measurement.

The wavelength selection member 72 can be obtained, for example, by forming or attaching a dichroic filter formed of a multilayer film on or to the surface of a light-transmitting resin substrate and can also be a substrate whose material itself has wavelength-selective transmittance.

In the case of the tenth embodiment, the image light generating device 41 is disposed closer to the second emitting-side diffraction element 59c than the infrared light emitting device 31 and the infrared light receiving device 33 are in the extension direction of the second light guide member 59a, that is, in the X direction. Thus, the first light guide members 50a are shorter than the second light guide member 59a in the extension direction. As a result, the wavelength selection member 72 is disposed closer to the second emitting-side diffraction element 59c than the infrared light emitting device 31 and the infrared light receiving device 33 are. This can minimize the range in which the wavelength selection member 72 is provided.

Eleventh Embodiment

A virtual image display device according to an eleventh embodiment of the present disclosure will be described below. The virtual image display device of the eleventh embodiment is a partial modification of the virtual image display device of the first or fifth embodiment and description of common parts will be omitted.

Figure 20:
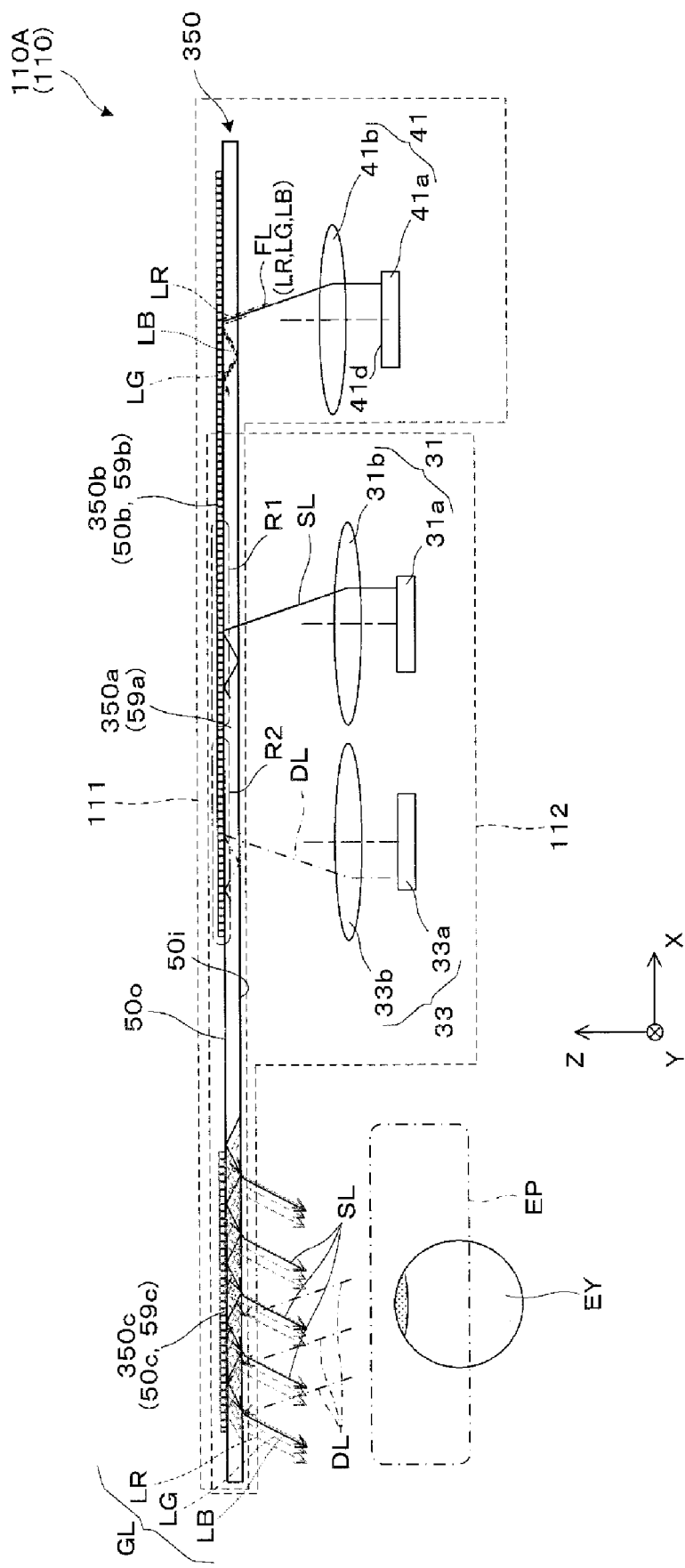
FIG. 20 is a plan view of a virtual image display device according to an eleventh embodiment.

In a first virtual image display device 110A shown in FIG. 20, a first light guide optical system 350 that emits image light FL as display light GL is obtained by integrating the diffractive light guide members 51, 52, and 53 and the second light guide optical system 58 shown in FIG. 2 and alone enables three-color display and infrared illumination and detection.

The first light guide optical system 350 includes a first light guide member 350a, an incident diffraction layer 350b, and an emitting diffraction layer 350c. Among these, the incident diffraction layer 350b functions as a first incident-side diffraction element 50b and deflects image light FL emitted from the image light generating device 41 such that the image light FL enters the first light guide member 350a in a state in which it is guidable therein. The incident diffraction layer 350b also deflects illumination light SL emitted from the infrared light emitting device 31 such that the illumination light SL enters the first light guide member 350a in a state in which it is guidable therein. That is, a first incident-side diffraction element 50b of the eleventh embodiment also has the function of the second incident-side diffraction element 59b shown in FIG. 2. The emitting diffraction layer 350c functions as a first emitting-side diffraction element 50c and emits the image light FL guided in the first light guide member 350a toward the outside where the eye EY is present. The emitting diffraction layer 350c also emits the image light FL guided in the first light guide member 350a toward the outside where the eye EY is present. That is, a first emitting-side diffraction element 50c of the eleventh embodiment also has the function of the second emitting-side diffraction element 59c shown in FIG. 2. The first light guide member 350a is similar to the light guide plates 51a, 52a, and 53a of the first light guide optical system 50 and the light guide plate 58a of the second light guide optical system 58 shown in FIG. 2 and enables light guiding by total internal reflection by a pair of flat surfaces 50i and 50o. The image light generating device 41 is similar to that shown in FIG. 2 and the image light FL emitted from the image light generating device 41 includes image light LB, LG, and LR of three colors.

The incident diffraction layer 350b or the first incident-side diffraction element 50b injects the image light LB, LG, and LR of three colors or the infrared illumination light SL incident on it into the first light guide member 350a by diffraction such that it propagates in the first light guide member 350a. Specifically, the incident diffraction layer 350b or the first incident-side diffraction element 50b is, for example, a diffraction element formed of a reflective volume hologram. A three-dimensional pattern recorded on the diffraction element with the reflection volume hologram is set to make the diffraction angles of the image light LB, LG, and LR of three colors or the infrared illumination light SL, that is, the angles of reflection or the angles of incidence thereof in the first light guide member 350a, greater than a critical angle determined by the refractive index of the first light guide member 350a such that the image light LB, LG, and LR of three colors or the infrared illumination light SL propagate in the first light guide member 350a by total internal reflection.

The emitting diffraction layer 350c or the first emitting-side diffraction element 50c extracts the image light LB, LG, and LR of three colors or the infrared illumination light SL traveling in the −X direction as a whole in the first light guide member 350a out of the first light guide member 350a by diffraction and emits the image light LB, LG, and LR of three colors or the infrared illumination light SL toward the eye position EP where the eye EY of the wearer US is disposed. Specifically, the emitting diffraction layer 350c or the first emitting-side diffraction element 50c is, for example, a diffraction element formed of a reflective volume hologram. The three-dimensional pattern recorded on the diffraction element with the reflection volume hologram is set to, when the image light LB, LG, and LR of three colors or the infrared illumination light SL propagate while being totally reflected, transmit the image light LB, LG, and LR of three colors or the infrared illumination light SL by diffraction at a certain location while restoring angle information before being incident on the incident diffraction layer 350b or the first incident-side diffraction element 50b.

The emitting diffraction layer 350c or the first emitting-side diffraction element 50c injects measurement light DL, which has been reflected at the eye position EP and incident on the emitting diffraction layer 350c, into the first light guide member 350a by diffraction such that it travels in the +X direction as a whole.

In the eleventh embodiment, the maximum value of the angle formed between the measurement light DL which is infrared light that the first incident-side diffraction element 50b has deflected toward the infrared light receiving device 33 and the normal line of the first incident-side diffraction element 50b is greater than the maximum value of the angle formed between the image light FL incident on the first incident-side diffraction element 50b and the normal line of the first incident-side diffraction element 50b.

Figure 21:
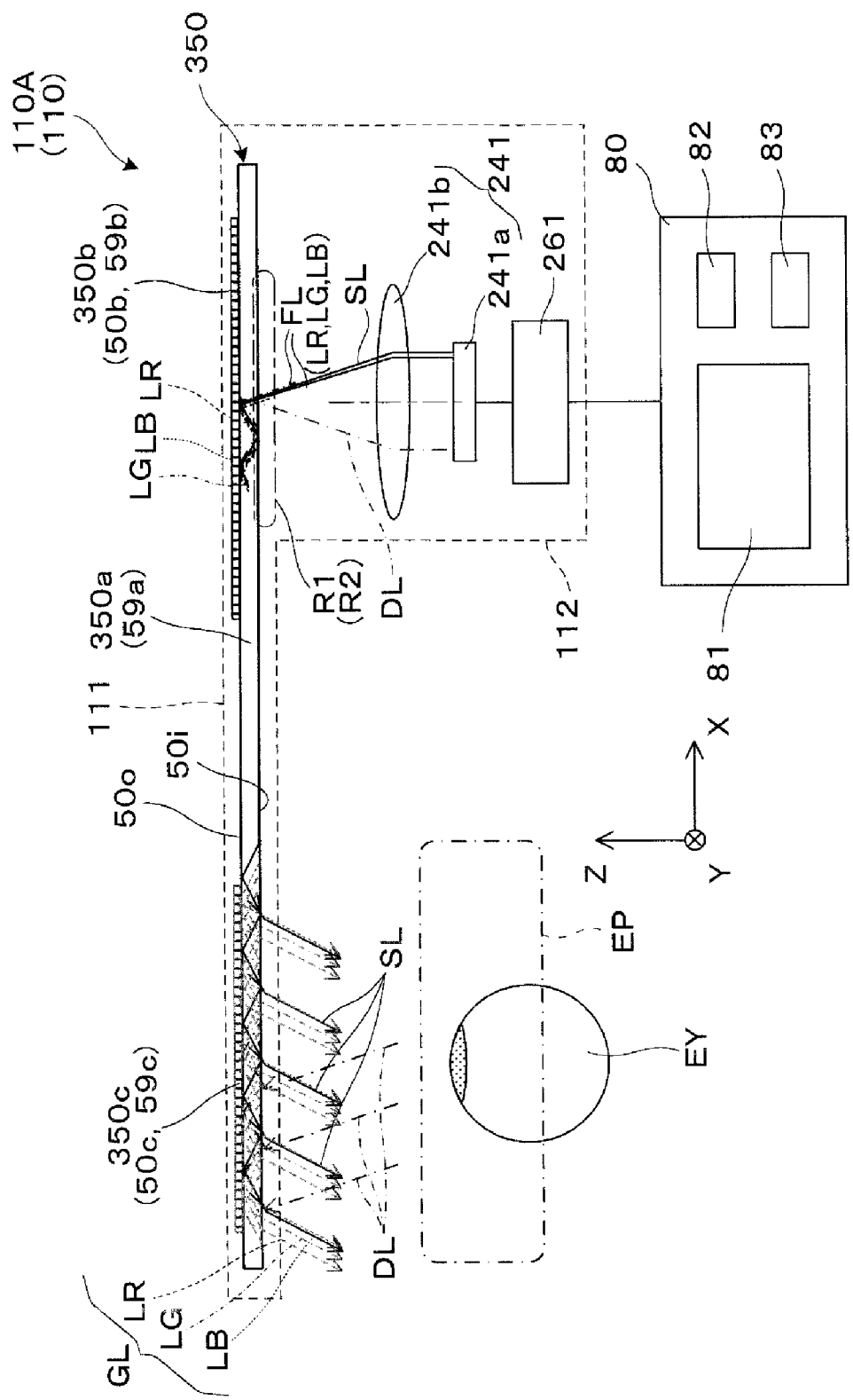
FIG. 21 is a diagram illustrating a modification of the virtual image display device shown in FIG. 20.

In the eleventh embodiment, a projection device 111 and a line-of-sight detection device 112 may adopt the configurations of the second to fourth embodiments. For example, the virtual image display device 110A can include the composite device 241 shown in FIG. 11 as shown in FIG. 21.

In the virtual image display device 110 of the eleventh embodiment described above, the maximum value of the angle formed between the measurement light DL which the first incident-side diffraction element 50b has deflected toward the infrared light receiving device 33 and the normal line of the first incident-side diffraction element 50b is greater than the maximum value of the angle formed between the image light FL incident on the first incident-side diffraction element 50b and the normal line of the first incident-side diffraction element 50b, whereby it is possible to detect the direction of the line of sight of the wearer US at a wider viewing angle than the viewing angle of the image light FL while limiting an increase in the size of the device. In addition, the first light guide optical system 350 is obtained by integrating the first light guide optical system for the colors and the second light guide optical system, thus facilitating a reduction in the weight and thickness of the virtual image display device 110.

Twelfth Embodiment

A virtual image display device according to a twelfth embodiment of the present disclosure will be described below. The virtual image display device of the twelfth embodiment is a partial modification of the virtual image display device of the first or eleventh embodiment and description of common parts will be omitted.

Figure 22:
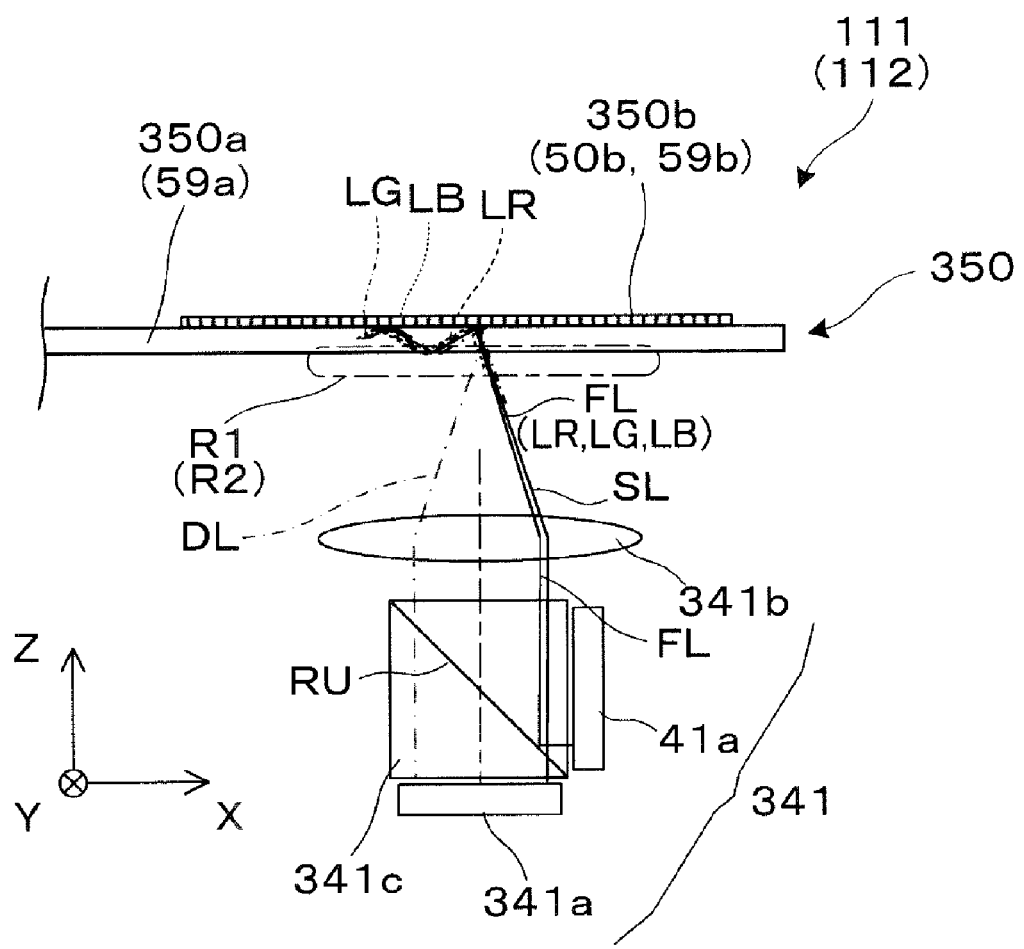
FIG. 22 is a plan view of a virtual image display device according to a twelfth embodiment.

In a projection device 111 of a first virtual image display device 110A shown in FIG. 22, a composite device 341 serves as all of the image light generating device 41, the infrared light emitting device 31, and the infrared light receiving device 33 shown in FIG. 2. The composite device 341 includes a display panel 41a, a composite unit 341a, a collimator lens 341b, and a dichroic mirror cube 341c. The composite unit 341a serves as both the infrared light source 31a and the infrared sensor 33a shown in FIG. 2. In the shown example, a light guide optical system employs the configuration of the first light guide member 350a shown in FIG. 20, but it may also employ configurations of other embodiments.

The dichroic mirror cube 341c has a reflective surface RU that transmits light in a specific wavelength range and reflects the rest of the wavelength range. The reflective surface RU reflects image light FL emitted from the display panel 41a to direct it to the first light guide member 350a and transmits illumination light SL emitted from the composite unit 341a to direct it to the first light guide member 350a. The reflective surface RU also transmits measurement light DL emitted from the first light guide member 350a to direct it to the composite unit 341a.

Others

The structures described above are examples and various modifications can be made without departing from the scope capable of achieving the same functions.

Although it has been described above that the first light guide optical system 50 includes the three diffractive light guide members 51, 52, and 53 and the image light FL of three colors RGB are guided respectively in the diffractive light guide members 51, 52, and 53 for the colors, the image light generating device 41 may be a monochromatic display device and image light FL may be guided in a single diffractive light guide member 51.

The first infrared diffraction layer 58*b* or the second incident-side diffraction element 59*b* is not limited to a relief diffraction grating and can be replaced with a diffraction element formed of a transmission volume hologram or a reflection volume hologram and the second infrared diffraction layer 58*c* or the second emitting-side diffraction element 59*c* is also not limited to a relief diffraction grating and can be replaced with a diffraction element formed of a transmission volume hologram or a reflection volume hologram. Also, the first incident-side diffraction element 50*b* and the first emitting-side diffraction element 50*c* are not limited to relief diffraction gratings and can be replaced with diffraction elements formed of a transmission volume hologram or a reflection volume hologram.

Although the above description has been given with respect to an example in which the image light generating device 41 includes the display panel 41*a* and the collimator lens 41*b*, it can be replaced by a MEMS scanner. The MEMS scanner includes, for example, a laser light source, a MEMS mirror, and an imaging lens and the MEMS mirror is provided at the position of the display panel 41*a*.

Although it has been described above that the virtual image display device 110 or the like can be used as an HMD, the present disclosure is not limited thereto and can be applied to various optical devices, for example, a head-up display (HUD).

Although the above description has been given with respect to a see-through virtual image display device for viewing an external image (a real object) and a virtual image in a superimposed manner, the present disclosure is not limited thereto and can be adopted to view so-called closed type virtual reality.

A virtual image display device according to a specific aspect includes an image light generating device configured to emit image light, an infrared light emitting device configured to emit infrared light, an infrared light receiving device configured to receive the infrared light, a first light guide optical system including a first light guide member, a first incident-side diffraction element provided on an incident side of the first light guide member, and a first emitting-side diffraction element provided on an emitting side of the first light guide member, and a second light guide optical system including a second light guide member, a second incident-side diffraction element provided on an incident side of the second light guide member, and a second emitting-side diffraction element provided on an emitting side of the second light guide member, wherein the first incident-side diffraction element deflects the image light emitted from the image light generating device such that the image light is incident on the first light guide member, the first emitting-side diffraction element deflects the image light guided in the first light guide member and emits the image light toward an eye position of a user, the second incident-side diffraction element deflects the infrared light emitted from the infrared light emitting device such that the infrared light is incident on the second light guide member, the second emitting-side diffraction element deflects the infrared light guided in the second light guide member and emits the infrared light toward the eye position of the user and deflects the infrared light from the eye position of the user such that the infrared light is incident on the second light guide member, the second incident-side diffraction element emits the infrared light deflected by the second emitting-side diffraction element and incident on the second light guide member toward the infrared light receiving device, and a maximum value of an angle formed between the infrared light that the second incident-side diffraction element has deflected toward the infrared light receiving device and a normal line of the second incident-side diffraction element with respect to a light guiding direction is greater than a maximum value of an angle formed between the image light incident on the first incident-side diffraction element and a normal line of the first incident-side diffraction element.

In this virtual image display device, the maximum value of the angle formed between the infrared light that the second incident-side diffraction element has deflected toward the infrared light receiving device and the normal line of the second incident-side diffraction element is greater than the maximum value of the angle formed between the image light incident on the first incident-side diffraction element and the normal line of the first incident-side diffraction element, whereby it is possible to detect the direction of the line of sight of the user at a wider viewing angle than the viewing angle of the image light while limiting an increase in the size of the device.

A virtual image display device according to a specific aspect includes an image light generating device configured to emit image light, an infrared light emitting device configured to emit infrared light, an infrared light receiving device configured to receive the infrared light, and a first light guide optical system including a first light guide member, a first incident-side diffraction element provided on an incident side of the first light guide member, and a first emitting-side diffraction element provided on an emitting side of the first light guide member, wherein the first incident-side diffraction element deflects the image light emitted from the image light generating device and the infrared light emitted from the infrared light emitting device such that the image light and the infrared light are incident on the first light guide member, the first emitting-side diffraction element deflects the image light and the infrared light guided in the first light guide member and emits the image light and the infrared light toward an eye position of a user and deflects the infrared light from the eye position of the user such that the infrared light is incident on the first light guide member, the first incident-side diffraction element emits the infrared light deflected by the first emitting-side diffraction element and incident on the first light guide member toward the infrared light receiving device, and a maximum value of an angle formed between the infrared light that the first incident-side diffraction element has deflected toward the infrared light receiving device and a normal line of the first incident-side diffraction element with respect to a light guiding direction is greater than a maximum value of an angle formed between the image light incident on the first incident-side diffraction element and a normal line of the first incident-side diffraction element.

In this virtual image display device, the maximum value of the angle formed between the infrared light that the first incident-side diffraction element has deflected toward the infrared light receiving device and the normal line of the first incident-side diffraction element is greater than the maximum value of the angle formed between the image light incident on the first incident-side diffraction element and the normal line of the first incident-side diffraction element, whereby it is possible to detect the direction of the line of sight of the user at a wider viewing angle than the viewing angle of the image light while limiting an increase in the size of the device. In addition, the first light guide optical system is obtained by integrating the light guide optical system for image light and the light guide optical system for infrared light, whereby it is easy to reduce the weight and thickness of the virtual image display device.

In a specific aspect, a light receiving area of the infrared light receiving device is larger than a display area of the image light generating device.

In a specific aspect, the number of light receiving elements of the infrared light receiving device is smaller than the number of pixels in a display area of the image light generating device. In this case, the number of light receiving elements can be reduced in accordance with the detection resolution of the line of sight, the structure of the infrared light receiving device can be simplified, and an increase in the amount of information processing can be limited.

In a specific aspect, the infrared light receiving device includes a plurality of light receiving elements and the plurality of light receiving elements are arranged at predetermined intervals.

In a specific aspect, the infrared light emitting device includes a plurality of light emitting elements and the plurality of light emitting elements are arranged at predetermined intervals.

In a specific aspect, the plurality of light receiving elements and the plurality of light emitting elements are arranged in the same surface. In this case, an active device of the virtual image display device can be made compact and the horizontal width size of the virtual image display device can be reduced.

In a specific aspect, the plurality of light receiving elements, the plurality of light emitting elements, and the plurality of pixels in the display area of the image light generating device are arranged in the same surface. In this case, an active device of the virtual image display device can be made compact and the horizontal width size of the virtual image display device can be further reduced.

In a specific aspect, the plurality of light receiving elements and the plurality of light emitting elements are arranged around the plurality of pixels in the display area of the image light generating device.

In a specific aspect, the second light guide optical system is disposed closer to the eye position of the user than the first light guide optical system is in a direction normal to the second light guide member. In this case, it is possible to prevent the first light guide optical system or the first incident-side diffraction element from attenuating infrared light incident on the eye and infrared light reflected by the eye and thus to improve the detection accuracy of the line of sight while maintaining display image quality.

In a specific aspect, the second incident-side diffraction element is disposed closer to the second emitting-side diffraction element than the first incident-side diffraction element is in an extension direction, that is, a longitudinal direction, of the second light guide optical system. In this case, it is possible to prevent the second incident-side diffraction element from affecting image quality due to overlapping of image light and infrared light on the incident side.

In a specific aspect, the infrared light emitting device is disposed closer to the second emitting-side diffraction element than the infrared light receiving device is in an extension direction, that is, a longitudinal direction, of the second light guide optical system.

What is claimed is:

1. A virtual image display device comprising:
    an image light generating device configured to emit image light;
    an infrared light emitting device configured to emit infrared light;
    an infrared light receiving device configured to receive the infrared light;
    a first light guide optical system including a first light guide member, a first incident-side diffraction element provided on an incident side of the first light guide member, and a first emitting-side diffraction element provided on an emitting side of the first light guide member; and
    a second light guide optical system including a second light guide member, a second incident-side diffraction element provided on an incident side of the second light guide member, and a second emitting-side diffraction element provided on an emitting side of the second light guide member,
    wherein the first incident-side diffraction element deflects the image light emitted from the image light generating device such that the image light is incident on the first light guide member,
    the first emitting-side diffraction element deflects the image light guided in the first light guide member and emits the image light toward an eye position of a user,
    the second incident-side diffraction element deflects the infrared light emitted from the infrared light emitting device such that the infrared light is incident on the second light guide member,
    the second emitting-side diffraction element deflects the infrared light guided in the second light guide member and emits the infrared light toward the eye position of the user and deflects the infrared light from the eye position of the user such that the infrared light is incident on the second light guide member,
    the second incident-side diffraction element emits the infrared light, deflected by the second emitting-side diffraction element and incident on the second light guide member, toward the infrared light receiving device, and
    a maximum value of an angle formed between the infrared light that the second incident-side diffraction element deflects toward the infrared light receiving device and a normal line of the second incident-side diffraction element with respect to a light guiding direction is greater than a maximum value of an angle formed between the image light incident on the first incident-side diffraction element and a normal line of the first incident-side diffraction element.

2. The virtual image display device according to claim 1, wherein a light receiving area of the infrared light receiving device is larger than a display area of the image light generating device.

3. The virtual image display device according to claim 1, wherein the infrared light receiving device includes a plurality of light receiving elements, and the number of the light receiving elements is smaller than the number of a plurality of pixels in a display area of the image light generating device.

4. The virtual image display device according to claim 3, wherein the infrared light emitting device includes a plurality of light emitting elements, and the plurality of light emitting elements are arranged at predetermined intervals.

5. The virtual image display device according to claim 4, wherein the plurality of light receiving elements, and the plurality of light emitting elements are arranged in a same surface.

6. The virtual image display device according to claim 4, wherein the plurality of light receiving elements, the plurality of light emitting elements, and the plurality of pixels in the display area of the image light generating device are arranged in a same surface.

7. The virtual image display device according to claim 5, wherein the plurality of light receiving elements, and the plurality of light emitting elements are arranged around the plurality of pixels in the display area of the image light generating device.

8. The virtual image display device according to claim 1, wherein the infrared light receiving device includes a plurality of light receiving elements, and the plurality of light receiving elements are arranged at predetermined intervals.

9. The virtual image display device according to claim 1, wherein the second light guide optical system is disposed closer to the eye position of the user than the first light guide optical system is in a direction normal to the second light guide member.

10. The virtual image display device according to claim 1, wherein the second incident-side diffraction element is disposed closer to the second emitting-side diffraction element than the first incident-side diffraction element is in an extension direction of the second light guide optical system.

11. The virtual image display device according to claim 1, wherein the infrared light emitting device is disposed closer to the second emitting-side diffraction element than the infrared light receiving device is in an extension direction of the second light guide optical system.

12. A virtual image display device comprising:

an image light generating device configured to emit image light;

an infrared light emitting device configured to emit infrared light;

an infrared light receiving device configured to receive the infrared light; and a first light guide optical system including a first light guide member, a first incident-side diffraction element provided on an incident side of the first light guide member, and a first emitting-side diffraction element provided on an emitting side of the first light guide member, wherein the first incident-side diffraction element deflects the image light emitted from the image light generating device and the infrared light emitted from the infrared light emitting device such that the image light and the infrared light are incident on the first light guide member, the first emitting-side diffraction element deflects the image light and the infrared light guided in the first light guide member and emits the image light and the infrared light toward an eye position of a user and deflects the infrared light from the eye position of the user such that the infrared light is incident on the first light guide member, the first incident-side diffraction element emits the infrared light deflected by the first emitting-side diffraction element and incident on the first light guide member toward the infrared light receiving device, and a maximum value of an angle formed between the infrared light that the first incident-side diffraction element deflects toward the infrared light receiving device and a normal line of the first incident-side diffraction element with respect to a light guiding direction is greater than a maximum value of an angle formed between the image light incident on the first incident-side diffraction element and a normal line of the first incident-side diffraction element.

* * * * *